C. E. NICHOLSON.
TABULATING MACHINE.
APPLICATION FILED SEPT. 8, 1914.
1,241,140.
Patented Sept. 25, 1917.
12 SHEETS—SHEET 6.
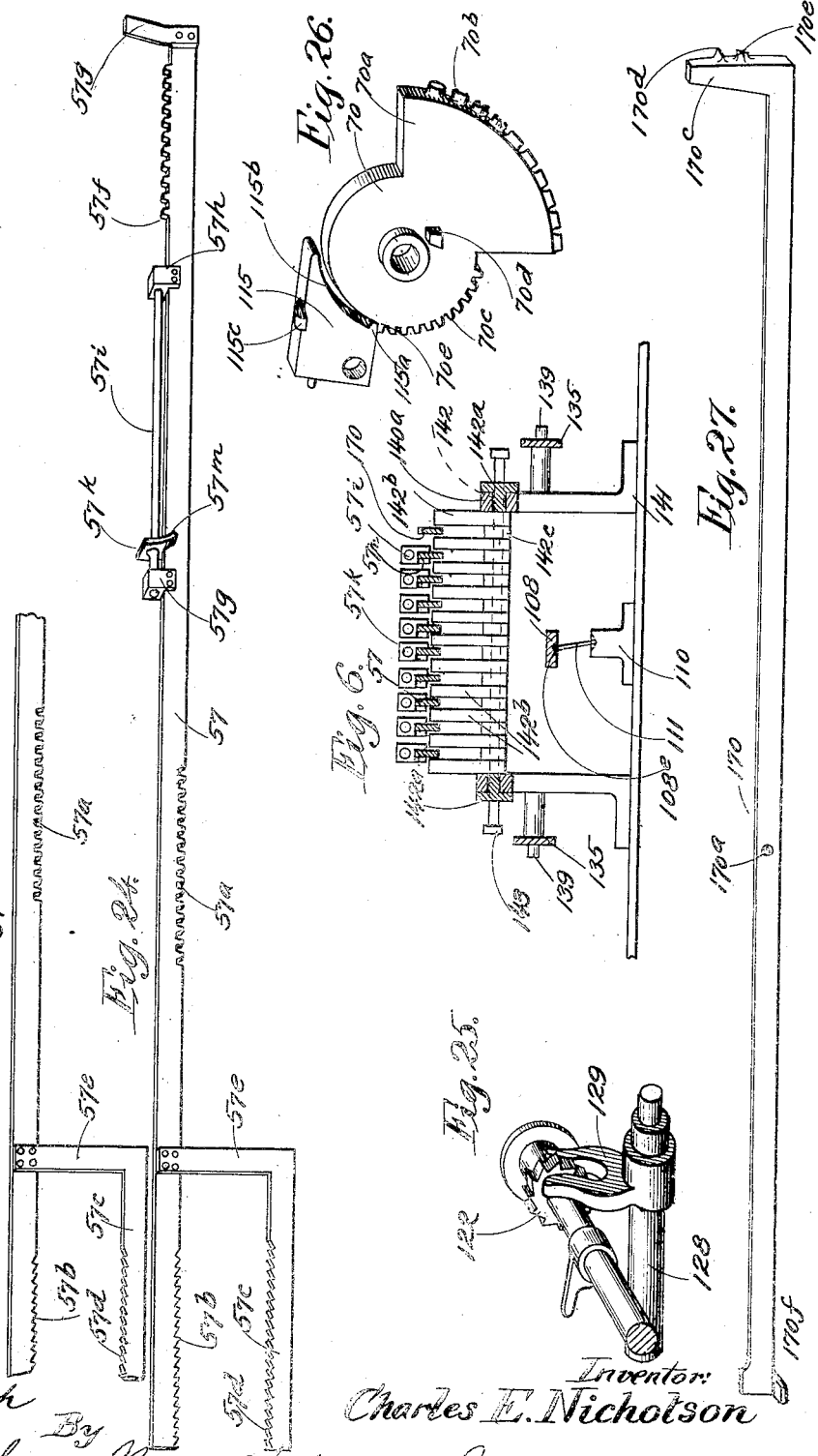

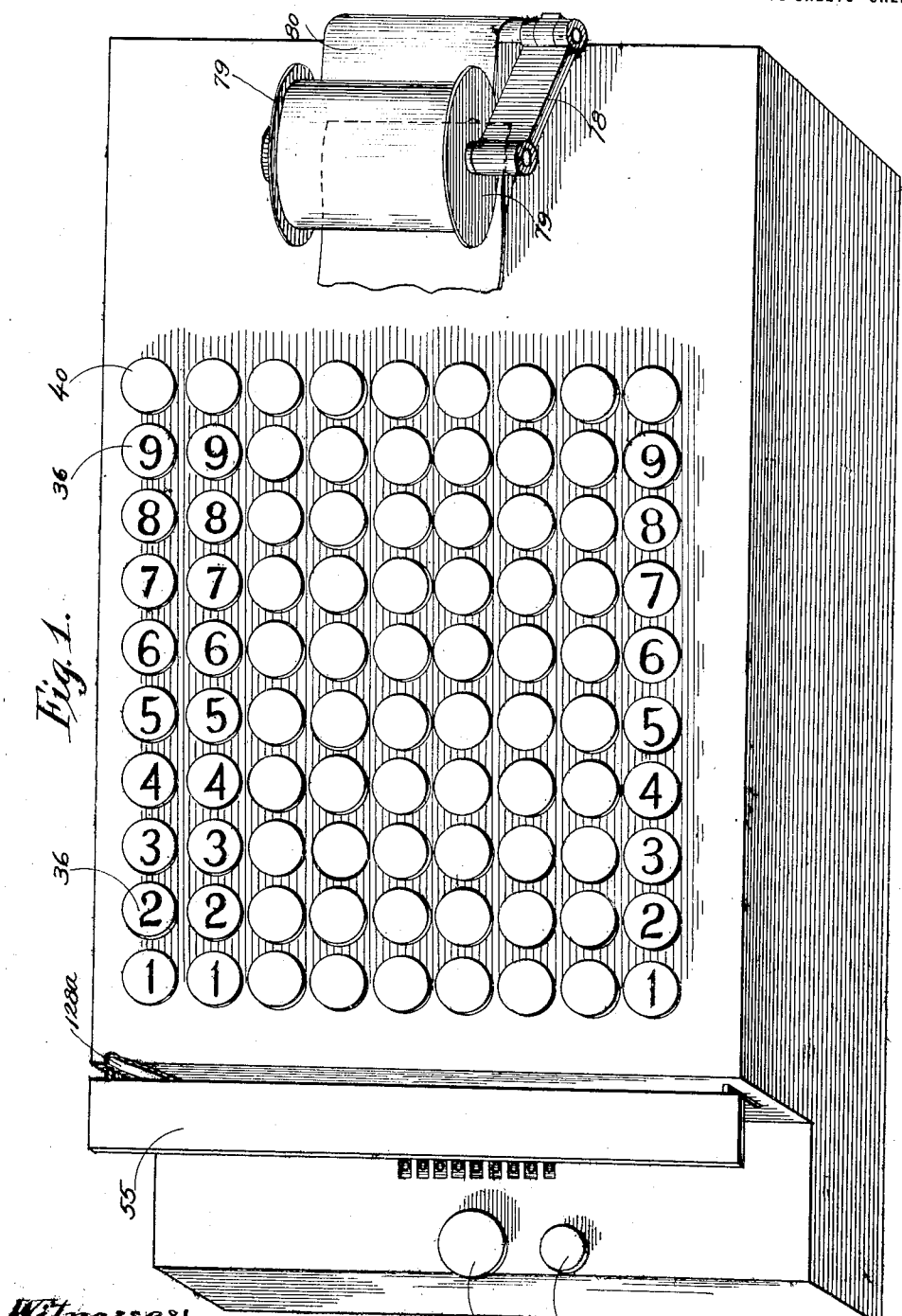

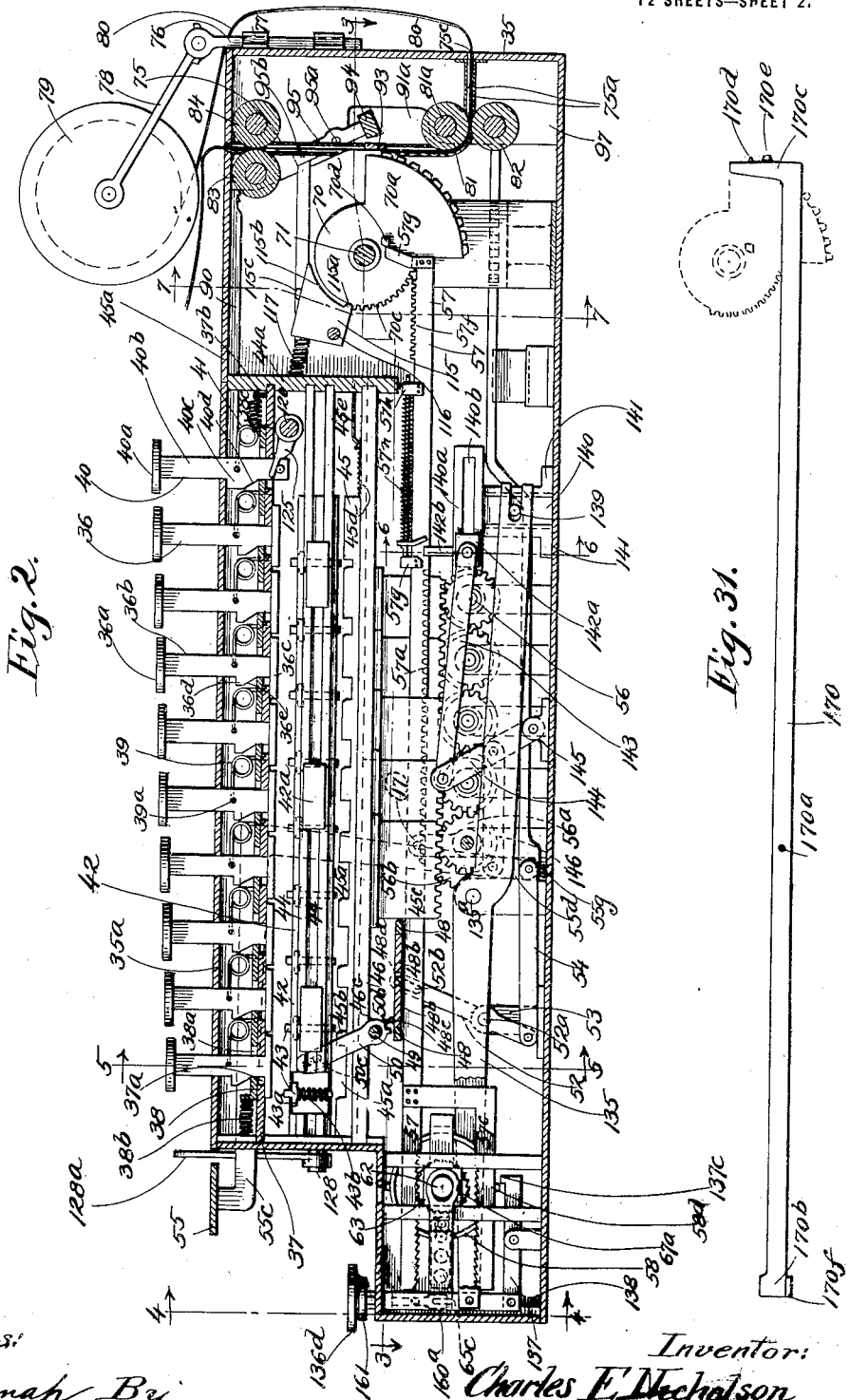

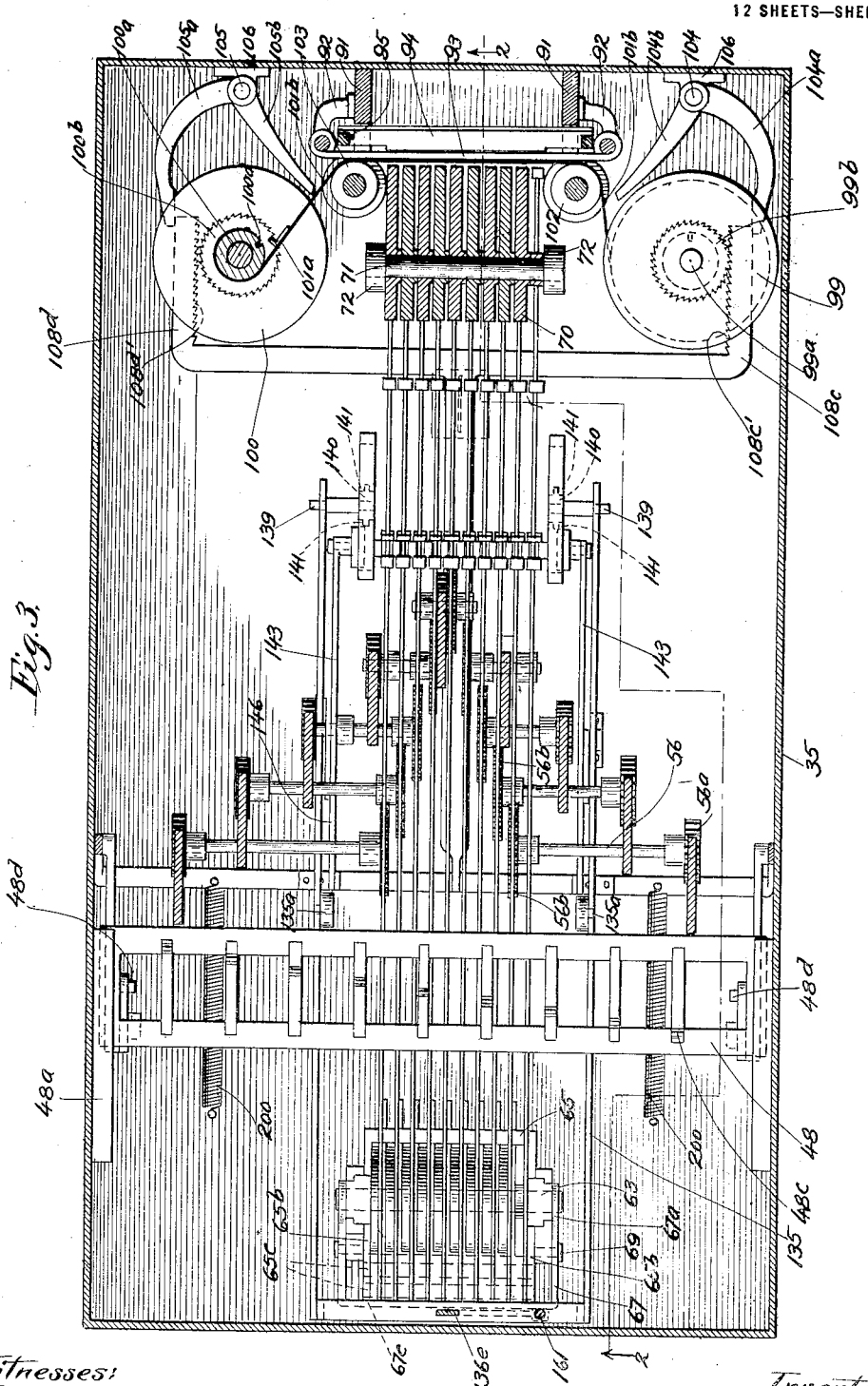

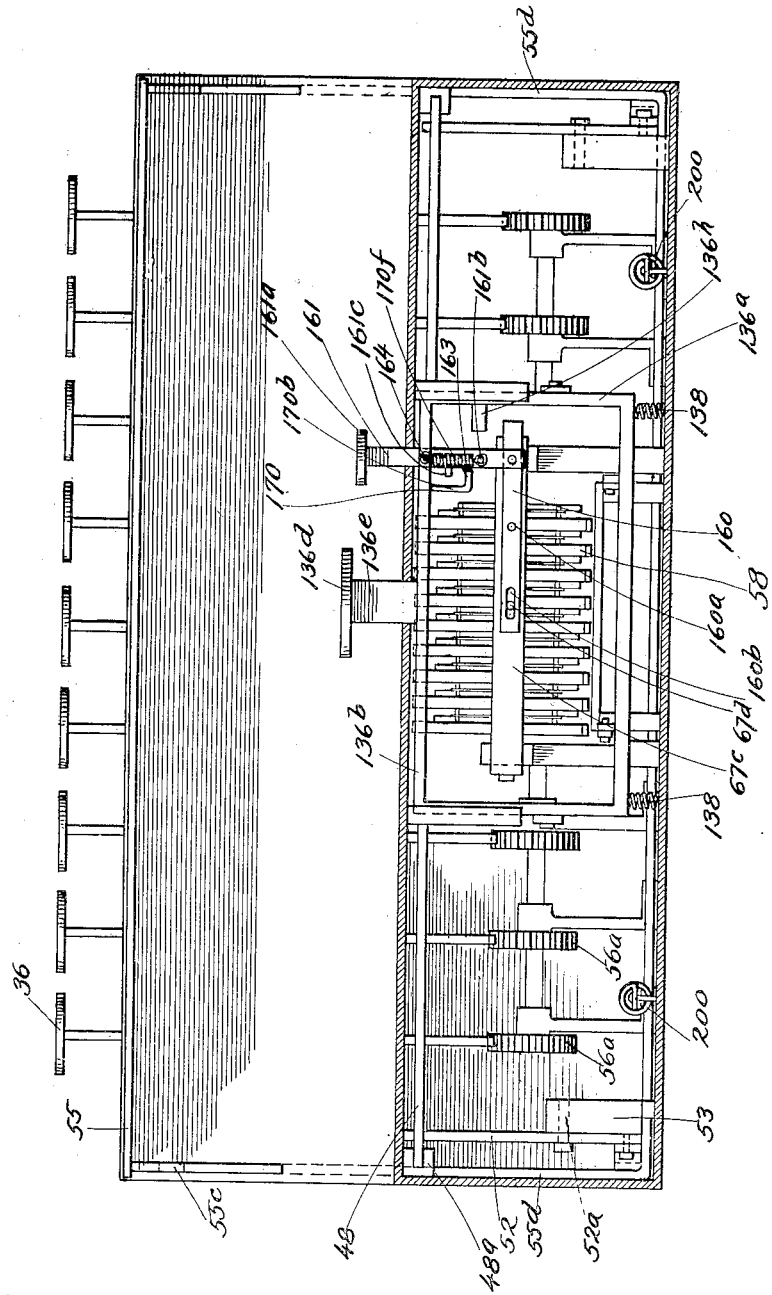

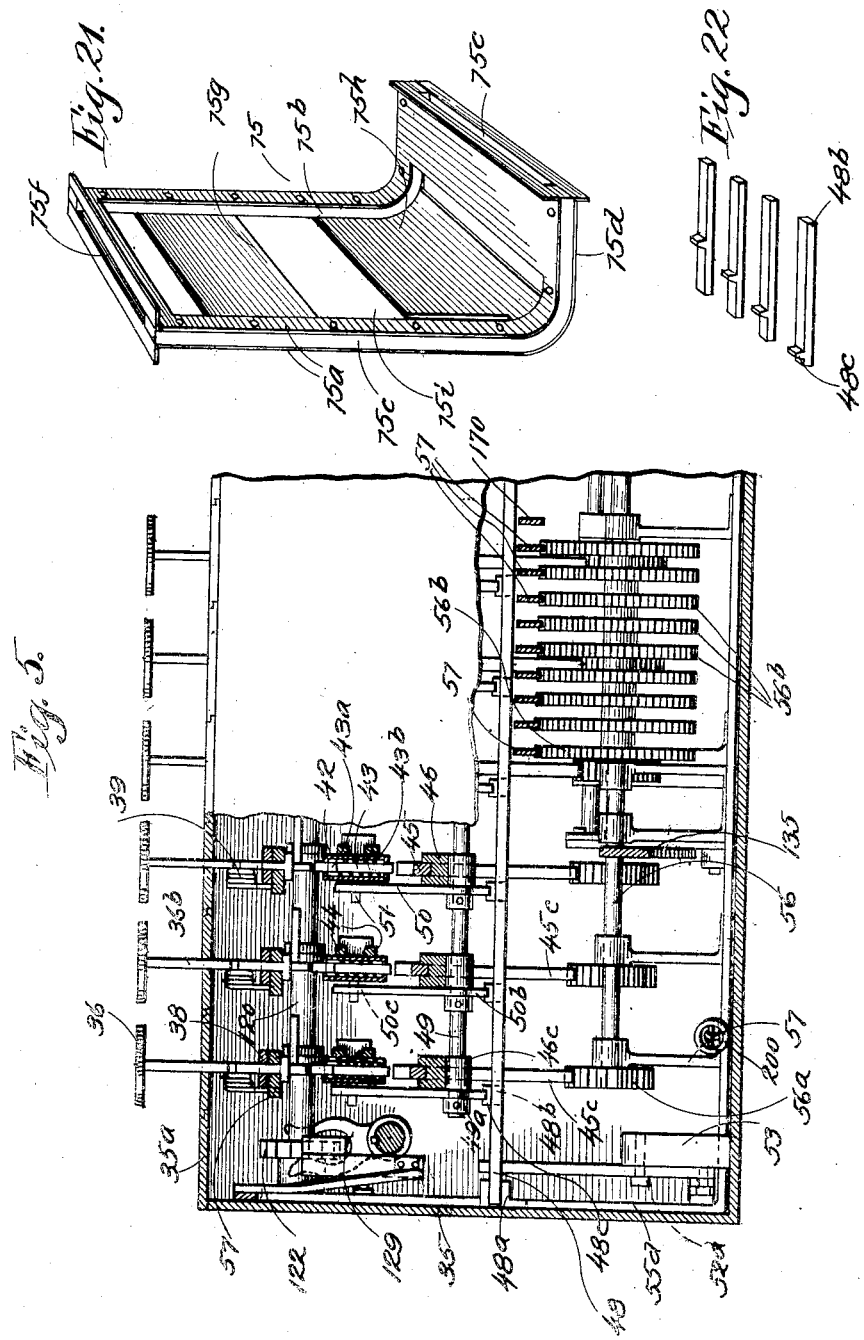

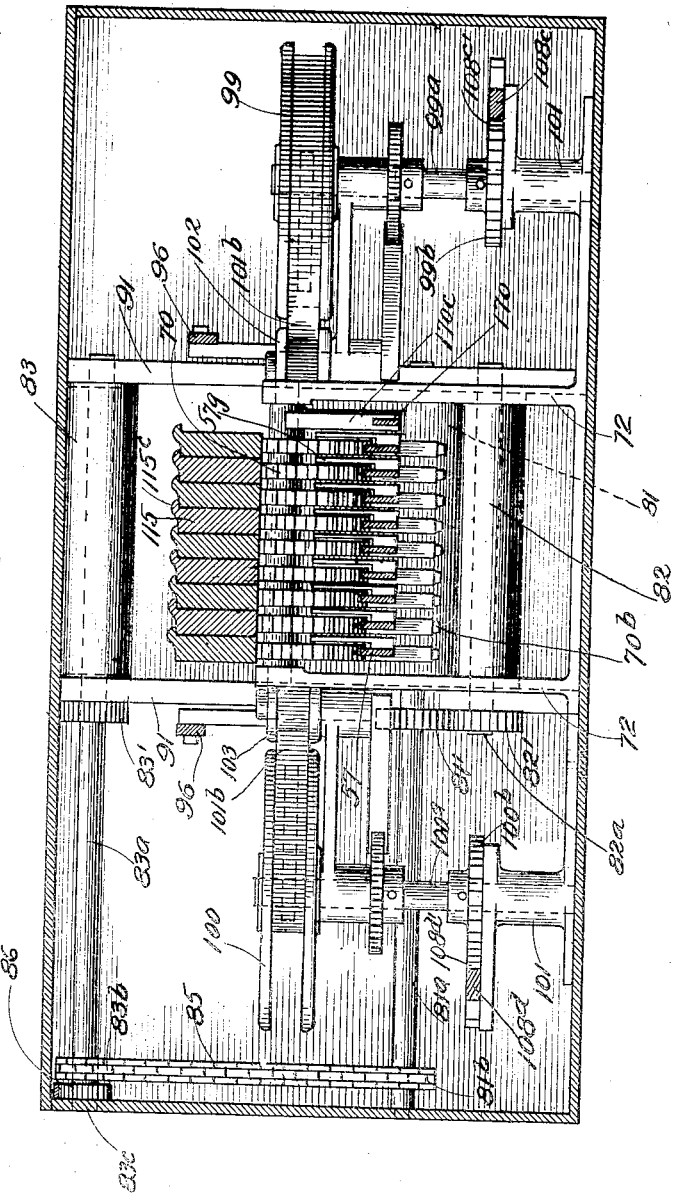

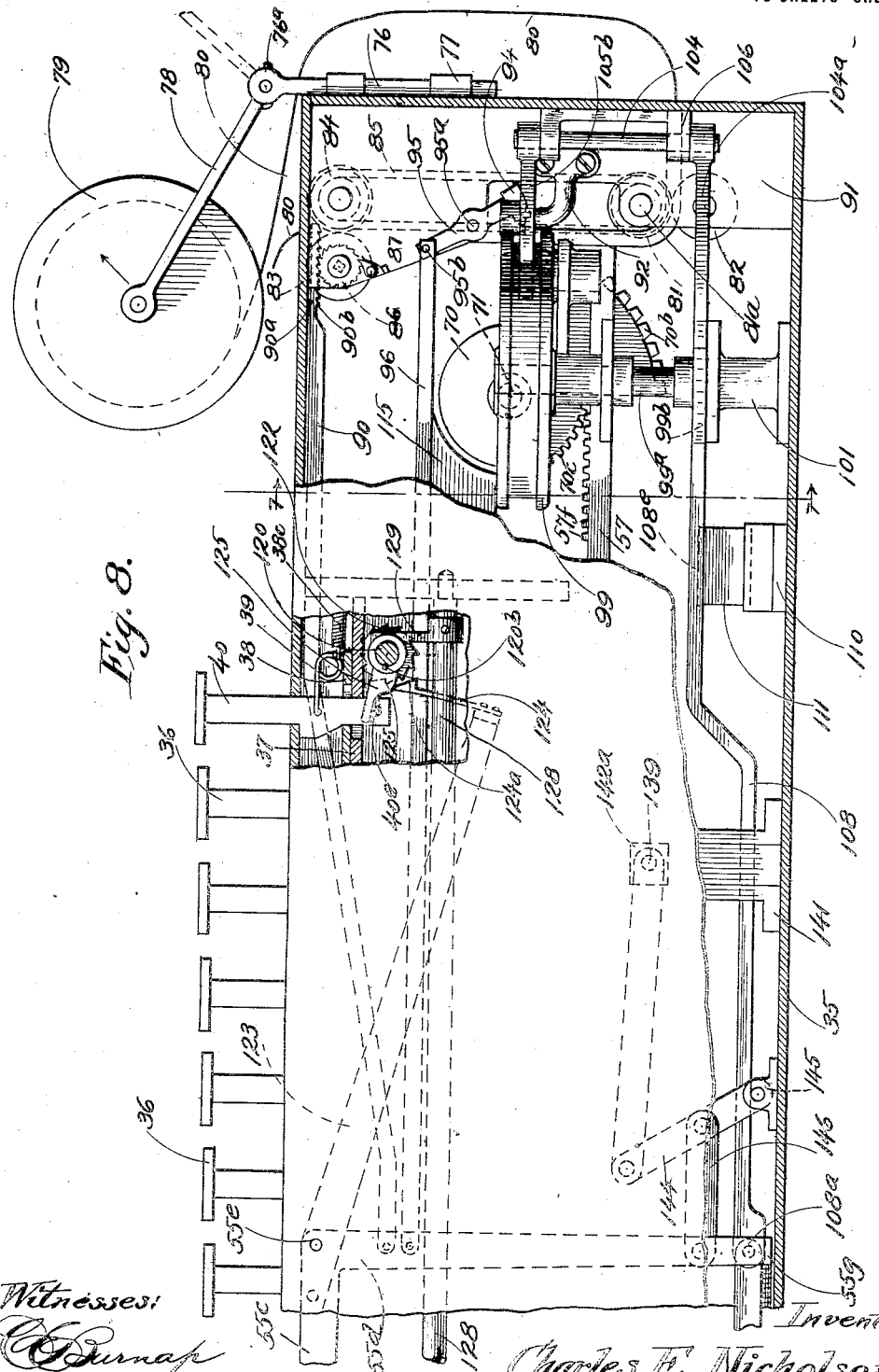

C. E. NICHOLSON.
TABULATING MACHINE.
APPLICATION FILED SEPT. 8, 1914.
1,241,140.
Patented Sept. 25, 1917.
12 SHEETS—SHEET 9.
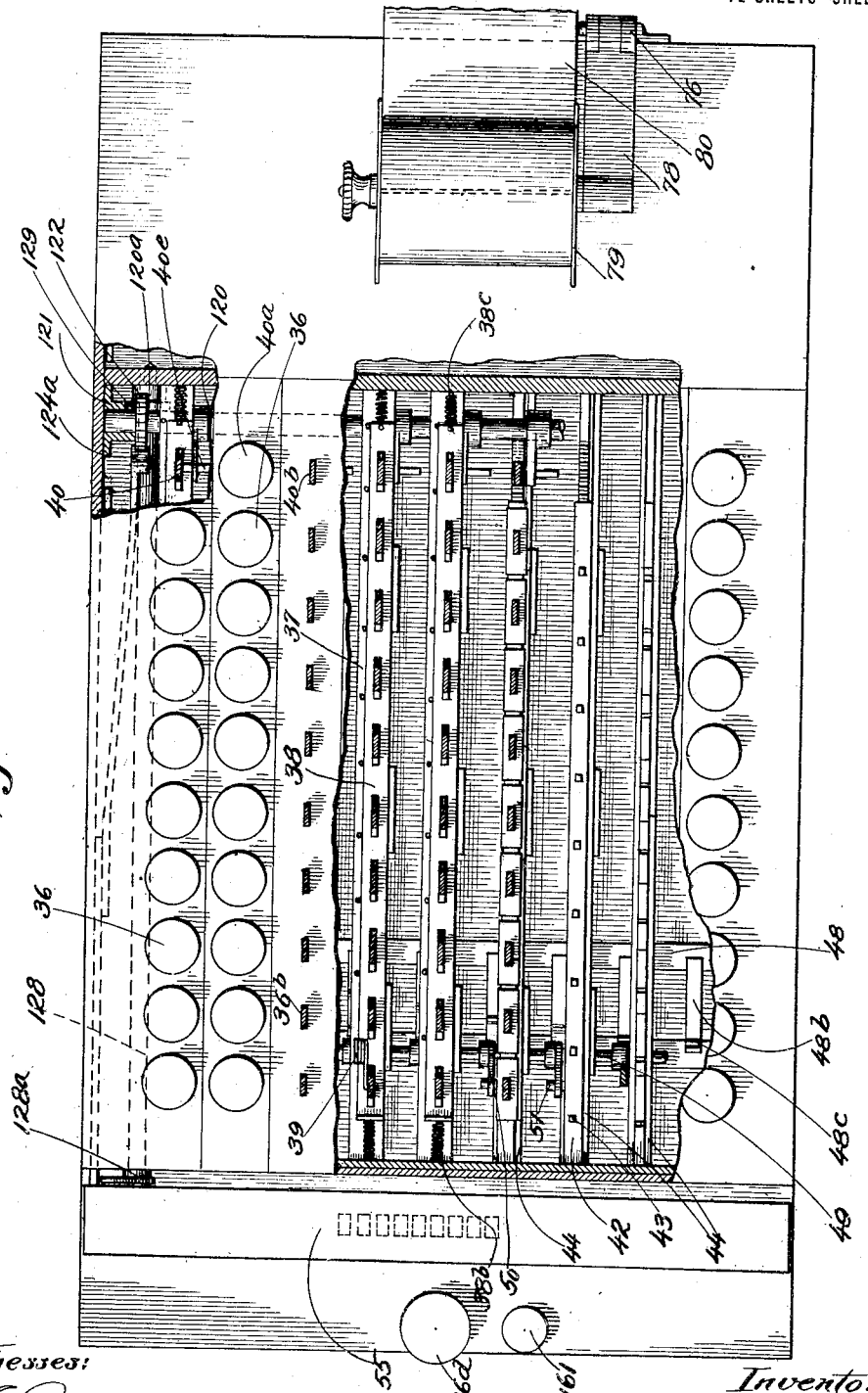

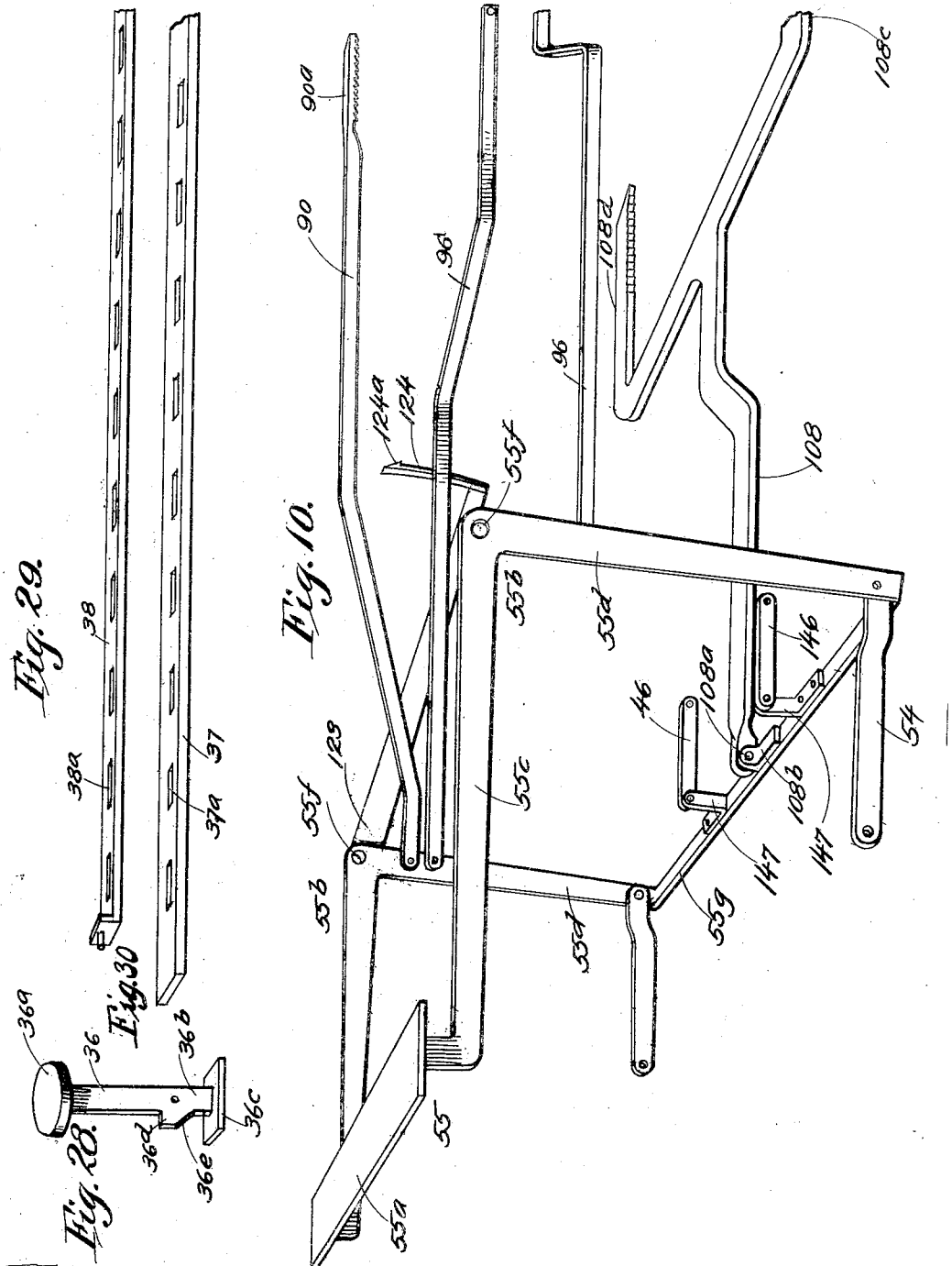

C. E. NICHOLSON.
TABULATING MACHINE.
APPLICATION FILED SEPT. 8, 1914.
1,241,140.
Patented Sept. 25, 1917.
12 SHEETS—SHEET 11.
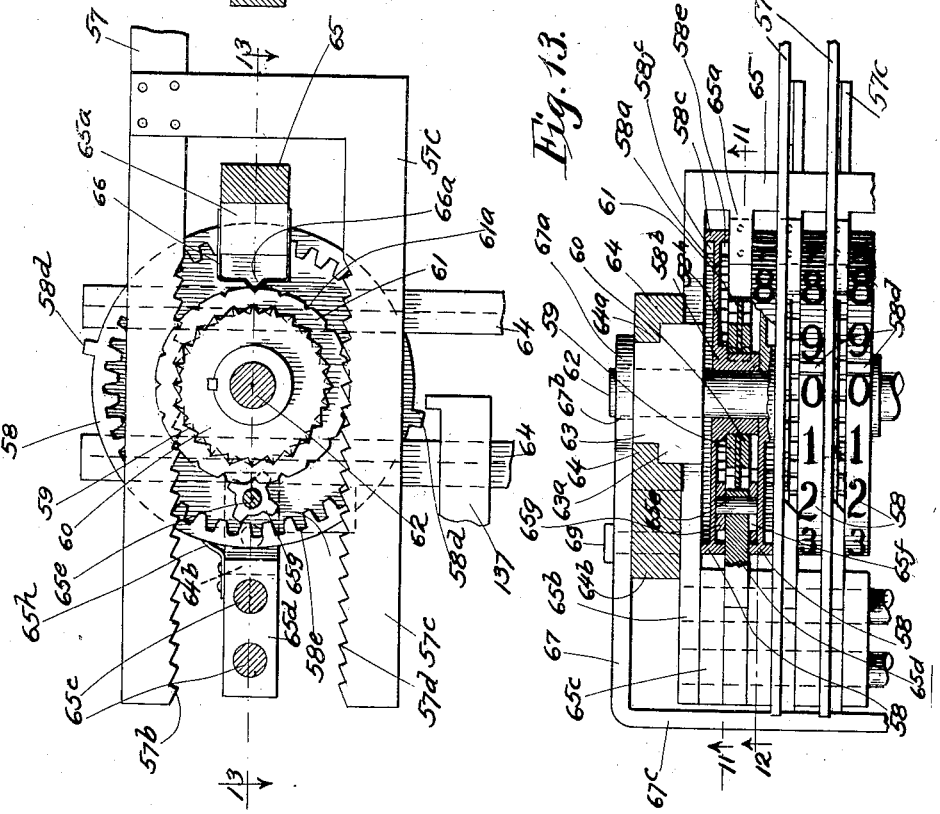
Witnesses:
C. C. Burnap
Henry A. Parkes
Inventor:
Charles E. Nicholson
By Sheridan, Wilkinson & Scott Attys

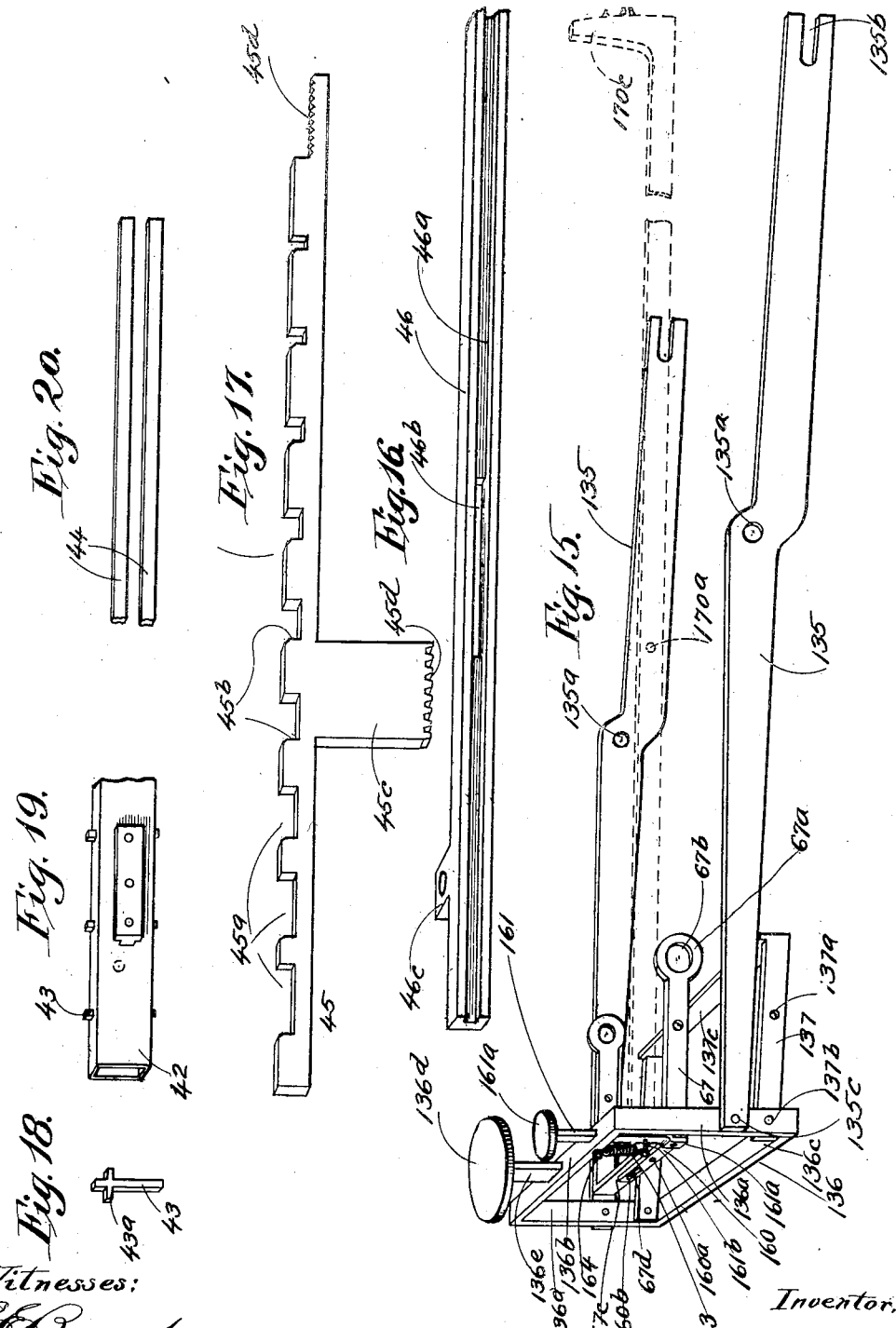

UNITED STATES PATENT OFFICE.

CHARLES E. NICHOLSON, OF BERWYN, ILLINOIS.

TABULATING-MACHINE.

1,241,140.   Specification of Letters Patent.   Patented Sept. 25, 1917.

Application filed September 8, 1914. Serial No. 860,687.

*To all whom it may concern:*

Be it known that I, CHARLES E. NICHOLSON, a citizen of the United States, residing at Berwyn, in the county of Cook and State of Illinois, have invented certain new and useful Improvements in Tabulating-Machines, of which the following is a specication.

This invention relates to improvements in computing machines, and more especially in that type of machine in which computations are both indicated and recorded.

The object of my invention is to provide such a machine in which various numbers may be added or subtracted and the numbers, together with the results of such addition or subtraction, will be printed. These functions are obtained by the use of more practical and less complicated mechanism than in present day practice and use.

Another object is to provide specific mechanism for the carrying out of the above object, a specific embodiment of the same being described below and shown in the accompanying drawings, in which—

Figure 1 is a perspective view of my machine, a few only of the key numerals being shown.

Fig. 2 is a vertical longitudinal section through my machine.

Fig. 3 is a horizontal section, taken along the line 3—3 of Fig. 2.

Fig. 4 is a view looking toward the front end of my machine partially in section, taken along the line 4—4 of Fig. 2.

Fig. 5 is a view similar to Fig. 4, taken along the line 5—5 of Fig. 2.

Fig. 6 is a section taken along the line 6—6 of Fig. 2.

Fig. 7 is a vertical section taken along the line 7—7 of Fig. 2.

Fig. 8 is a side elevation, partially in section, of a portion of the machine.

Fig. 9 is a plan view, partially in section.

Fig. 10 is a perspective view of the actuating bar and associated levers.

Fig. 11 is a detail side view, partly in section, of one of the indicator wheels and associated mechanism.

Fig. 12 is a sectional view of the other side of one of the indicator wheels and associated mechanism, on line 12 of Fig. 13.

Fig. 13 is a detail plan view, partly in section, of several of the indicator wheels.

Figs. 14 and 14ª are details of a spring detent associated with the indicator wheels.

Fig. 15 is a perspective detail of the totaling and subtraction keys and coöperating mechanisms.

Fig. 16 is a perspective view of one of the supporting strips.

Fig. 17 is a perspective view of one of the sliding strips and rack block members.

Fig. 18 is a detail perspective view of one of the pins.

Fig. 19 is a detail perspective view of one of the pin-carrying casings.

Fig. 20 is a perspective detail of one part of the pin-carrying casing supporting strips.

Fig. 21 is a perspective view of a paper guide.

Fig. 22 is a detail perspective view of four of the toothed strips for actuating the levers, which in turn actuate the pin-carrying casing.

Fig. 23 is a perspective detail of a part of the opposed indicator wheel-actuating racks.

Fig. 24 is a view similar to Fig. 23 showing a recorder actuating mechanism.

Fig. 25 is a detail perspective view of a repeat setting mechanism.

Fig. 26 is a detail view of a recorder wheel.

Fig. 27 is a perspective view of a recorder lever carrying subtraction and total indicating characters.

Fig. 28 is a perspective view of one of the number keys.

Fig. 29 is a perspective view of one of the slotted locking plates.

Fig. 30 is a perspective view of one of the coacting stationary plates; and

Fig. 31 is a side elevation of a recording lever and adjacent recorder wheel.

Like numerals refer to like elements throughout the drawings, in which 35 indicates the casing for the machine apertured on its top surface to permit the operation and insertion of the operating keys 36, preferably arranged in rows longitudinally, bearing the proper numbers in the arrangement shown, these numbers running from 1 to 9 from the front of the machine toward the back. These rows of keys, as is usual, represent columns from hundredths and tenths to millions in the embodiment shown. Each of these keys comprises the top disk 36ª, upon which is printed or carried the proper number and the stem 36ᵇ, (see Figs. 2 and 28) and at their lower extremities extends a plunger 36ᶜ. Located above the plunger 36ᶜ is the cam shoulder 36ᵈ having the inclined surface 36ᵉ. Located below the top 35ᵃ of the casing 35 are the stationary strips 37, (see Figs. 2 and 5, for example). These strips run longitudinally of the machine and are mutually parallel. Located above and sliding upon the stationary strips 37 are the locking plates 38 provided with the slots 38ᵃ therein. The stems 36ᵇ extend through these slots and also through slots 37ᵃ in the stationary plates or strips 37. Springs 38ᵇ extend between and are secured to the end of the casing 35 and the plates 38. Similarly, springs 38ᶜ are located at and secured to the other end of the plates 38, these springs having an end attached to the pins 37ᵇ carried by stationary plates 37. Coil springs 39 are provided with diverging ends, one end of each of these springs being attached to the stationary plates 37 which project to one side of the sliding or locking plates 38. The springs 39 have their other extremities attached to the stems 36ᵇ, the function of these springs being to resist movement of the cams 36 and to normally return them to position shown in Fig. 2. It will be apparent that when one of the keys 36 is depressed the cam shoulder 36ᵈ thereof will slide the locking plate 38 on to the plate 37 against the action of the springs 38ᵇ, 38ᶜ, to the shoulder passing beneath the said locking plate 38, whereupon the latter, through the action of the springs, slide back to position, locking the shoulder 36ᵈ and preventing the return of the corresponding key 36 to normal position.

When the wrong key in a longitudinal row has been depressed, or for some other reason it is desirable to return it to normal position, I provide for this by providing the re-set key 40 for each longitudinal row, as shown, for example, in Fig. 2. This re-set or correction key 40 is provided with a disk 40ᵃ and stem 40ᵇ, being similar in that respect to keys 36. It is also provided with a cam shoulder 40ᶜ having an inclined surface 40ᵈ adapted to slide the plate 38 on the plate 37 in a manner similar to that performed by the keys 36. From the inclined surface 40ᵈ, however, the shoulder portion 40ᶜ extends upwardly a greater distance than in the case of the numeral keys 36, so that in its downward movement it will maintain the plate 37 out of position, thereby permitting the key 36 of the corresponding row to return to normal. A spring 41 is provided for the re-set key 40, this spring being similar to springs 39, and operating to return key 40 to normal position when released. It is to be understood that there is one of these re-set keys for each longitudinal row of keys 36.

Located below each of the stationary strips 37 is a pin-carrying casing 42, in each of which are mounted a plurality of pins 43, these pins being each constructed with a cross arm 43ᵃ and having their extremities projecting through suitable apertures in the casing 42. A coiled spring 43ᵇ is located around each of the pins 43 between the cross arm 43ᵃ and the bottom of the casing 42, and, as shown in Fig. 2, the head of each of these pins 43 projects upwardly from the casing when in normal position, each pin being located beneath one of the plungers 36ᶜ. Adjacent the casings 42 are located spaced parallel guide strips 44. The casings 42 are provided with the T-shaped guide blocks 42ᵃ, these blocks being arranged between the guide strips, 44, as shown in Figs. 2, 5, and 19, thereby providing a slidable mounting for the casings 42, as will be apparent. The strips 44 are attached at one end to braces 44ᵃ depending from the top of the casing 35, and at their other ends are attached to the front of the casing, thereby providing a guide construction for the blocks 42ᵃ.

Located beneath each of the casings 42 is a sliding rack strip 45 having the depressions or recesses on the upper side. One of these depressions 45ᵃ is located beneath each of the pins 43, on each of the rack strips 45, these recesses 45ᵃ varying in length, front to back, as is clearly shown in Figs. 2 and 17 for a purpose to be described hereafter. These depressions form shoulders 45ᵇ adapted to be engaged by pins 43, as will be further explained.

Strips 46 are located below each of the rack strips 45, the supporting strips 46 being grooved at 46ᵃ to provide a seat for the strips 45, which are slidably mounted therein. These supporting strips 46 are attached at their front ends to the casing of the machine, and at their lower ends to the braces 44ᵃ, as is shown in Fig. 2. The rack strips 45 are provided with the back ends serrated as indicated at 45ᵈ, and are further provided with blocks or shoulders 45ᶜ, one of these blocks depending from and preferably being formed integral with each of the strips 45. These blocks are toothed at 45ᵈ on their lower surface and project through a slot 46ᵇ in the supporting strips 46. The latter are provided with depending lugs 46ᶜ, apertured for a purpose to be later described. A spring detent 45ᵉ extends from the braces 44ᵃ and engages the serrations 45ᵈ, so as to prevent over travel or accidental movement of the same.

Extending transversely of the machine is the reciprocating frame 48, carried at its ends upon suitable brackets 48ᵃ carried by the casing. This frame 48 carries cross strips 48ᵇ—see Figs. 2, 5, and 22. Each of these strips is provided with an upwardly projecting tooth 48ᶜ. I preferably arrange these teeth so that from one side of the machine to the other each tooth is located rearwardly of its neighbor on one side and forwardly of its neighbor on the other side, this relation being for a purpose to be described later.

A cross shaft 49 extends transversely of the machine, and is journaled in the apertured lugs 46$^c$ of supporting strips 46,—see Fig. 5, for example. A plurality of levers 50 are attached to this shaft 49 to oscillate therewith, one of these levers being provided for each longitudinal row of keys and being prevented from accidental displacement from said shaft by the collars 49$^a$. These levers have a short portion depending below the shaft 49, this short portion being forked or grooved at 50$^b$ for engagement by the teeth 48$^c$ of strips 48$^b$. Each of these levers 50 is slotted at its upper portion, as indicated by the numeral 50$^c$—see Figs. 2 and 5. Pins 51 extend outwardly from each side of each of the casings 42 and fit into slots 50$^c$ of the levers 50. It will be apparent that movement of the frame 48 to the left, as viewed in Fig. 2, will operate to successively move casings 42 through the medium of levers 50, the latter being actuated in succession from one side of the machine to the other by the engagement of respective teeth 48$^c$ with forks 50$^b$ of levers 50 and each lever 50 completing its function prior to the functioning of the next one. It will also be apparent that the short movement of the toothed strips 48$^b$ will result in a comparatively great movement of the casings 42, owing to the construction and movement of the levers 50. Pins 48$^d$ extend inwardly from the frame 48 at each end thereof, and levers are provided, said levers being pivotally mounted at 52$^a$ on the projecting brackets or supports 53. At their upper extremities these levers 52 are slotted at 52$^b$, the pins 48$^d$ fitting in said slots—see Figs. 2 and 3. Link arms 54 are pivotally attached to the other extremities of the levers 52, as shown in Fig. 2, for example.

What I term an actuating bar, generally indicated by numeral 55 (see Fig. 10) is provided, this bar comprising the cross plate 55$^a$ adapted to be depressed by the upper and the spaced apart levers 55$^b$. Each of these levers is provided with the angularly disposed arms 55$^c$, 55$^d$, the former being attached to the plate 55$^a$. The arms 55$^c$ extend through the front of the casing 35 and are pivoted to the latter by means of pins or rivets 55$^e$ projecting through the apertures 55$^f$ and carried by the casing—see Figs. 8 and 10, for example. The links 54 are pivotally attached at one extremity to the lower portions of the arms 55$^d$. A cross strip 55$^g$ extends across between and connects the arms 55$^d$ at the bottom thereof.

It will be apparent that depressing of the actuating plate or bar 55$^a$ downwardly will result in sliding the frame 48 toward the front of the machine through the medium of links 54 and levers 52, and this movement will result in the teeth 48$^c$ of strips 48$^b$ successively engaging the levers 50 from one side of the frame 48 to the other. Similarly, the casings 42 will be successively moved rearwardly. Such movement continues uninterruptedly until the downwardly extending portion of the pin 43 which has been depressed by one of the numeral plungers engages the shoulder at the end of its corresponding recess 45$^a$ in the rack strips 45. Further movement of the mechanism described will result in moving the rack strips with the corresponding casings 42. Owing to the variation in the length of the recesses 45$^a$, it will be apparent that the extent of movement of the rack strips will depend upon which of the pins 43 is depressed. By properly constructing the recesses 45$^a$ this movement of the rack strips will be proportional to the numeral on the key which is depressed. This movement is utilized as described below in the operation of the machine.

A plurality of cross shafts 56 is provided, these shafts being journaled in suitable bearings 57 extending upwardly from the base of the machine—see Fig. 5. Each shaft is provided with a pinion 56$^a$ meshing with one of the depending toothed blocks 45$^c$ in the rack strip 45, as shown in Figs. 2 and 5, for example. At their other ends the shafts 56 are provided with gears 56$^b$, which mesh with teeth 57$^a$ of bars 57—see Figs. 3, 5, 23, and 24. At their front ends these bars are provided with the notched teeth 57$^b$ in the lower side thereof. A parallel bar 57$^c$ is located beneath toothed portions 57$^b$ of each of the bars 57, and is provided with reversely notched teeth 57$^d$ facing the teeth 57$^b$. These parallel bars are attached to the main bars 57 by the angularly disposed arms 57$^e$—see Fig. 23, for example. It is to be noted that the parallel bars are offset with respect to the main bars, the distance of the offset being substantially the thickness of the arms 57$^e$. Indicator wheels 58 are provided, arranged in close parallel relation, one for each order or longitudinal row of numerals. Each of these wheels is formed with the central web or partition 58$^a$, and is further provided with the centrally located hub portion 58$^b$—see Fig. 13, for example. The peripheral flange 58$^c$ carries the numerals thereon, and in the embodiment shown I have constructed each of these indicator wheels with two sets of numbers from zero to 9 inclusive. The hub portions 58$^b$ are centrally apertured, and extend sufficiently beyond the flanges 58$^c$ to provide a space between the flanges of adjacent wheels, as is clearly shown in Fig. 13. Each of the wheels 58 is provided with the diametrically opposed lugs 58$^d$ in the periphery thereof, for a purpose to be later described. The peripheral flanges 58° are each toothed on one side of the central web or partition 58ᵃ, as clearly shown in Fig. 11, for example, these teeth being indicated by numeral 58ᵉ. The peripheral flanges 58° on the opposite side of the partition 58ᵃ are each provided with diametrical teeth 58ᶠ. A pair of ratchet wheels 59 and 60 are located on each of the hub portions 58ᵇ, being located in alinement with the space between the adjacent pairs of wheels and being maintained in such alinement as shown at 58ʰ on the hub portions 58ᵇ. These ratchet wheels are provided with ratchet teeth, the teeth of one of the wheels being oppositely or reversely arranged with respect to those of the other wheel. The disk or wheel 61 is located between each pair of ratchet wheels 59 and 60, these disks 61 being provided with notches or serrations 61ᵃ near its periphery. The wheels 59, 60, and 61 are all keyed to the hubs 58ᵇ of respective indicator wheels 58 to rotate therewith, while these wheels are rotatably mounted upon the cross shaft 62.

Adjacent its extremities, the shaft 62 is carried by blocks 63, these blocks being provided with shoulders 63ᵃ. Each of these blocks is slidably mounted in the parallel braces 64, which braces are provided with the shoulders 64ᵃ, against which abut the shoulder 63ᵃ and the blocks 63. The ends of the shaft 62 project outwardly of the blocks 63 a slight distance, for a purpose to be hereinafter described.

A cross bar 65 is located adjacent one side of the wheels 58 parallel to the shaft 62, and this cross bar is provided with a plurality of lugs or shoulders 65ᵃ projecting between the adjacent pairs of wheels 58. A strap or yoke 66, secured by pins or the like to each of the lugs 65ᵃ, is provided with a spur or corrugation 66ᵃ adapted to engage notches 61ᵃ of disk 61, acting as a spring detent, as will be obvious. Extending transversely of the shaft 62, adjacent each end thereof, are the arms 65ᵇ, between which extend the pins 65ᶜ. Rigidly attached to and carried by these pins are the blocks 65ᵈ extending also between the pairs of wheels 58. A cross shaft 65ᵉ is journaled in each of these blocks, and carries at one side thereof a gear wheel 65ᶠ, and at its other side a second spur or gear wheel 65ᵍ. The former is provided with the teeth 65ᶠ′, and the latter is provided with the teeth 65ᵍ′, so arranged that they normally engage the teeth 58ᵉ of the adjacent indicator wheel 58, the teeth of the gear wheel 65ᵍ being so located as to engage only alternate of the teeth 58ᵉ, and also being arranged so that when in the position indicated in Fig. 11 they will permit passage thereby of teeth 58ᵉ without engagement therewith—see Fig. 11, for example. The spur gear 65ᶠ is constructed for engagement and rotation by the teeth 58ᶠ, and is so constructed that each engagement of one of said teeth will rotate the spur gear 65ᶠ a quarter of a revolution, so that each half revolution of the indicator wheel 58—as shown in Fig. 12—will rotate the spur gear 65ᶠ quarter of a revolution. The spring 65ʰ is attached to the block 65ᵈ, this spring being partially looped and arranged to fit between adjacent teeth of the pinion 65ᶠ and operating to insure a quarter revolution of the latter, also acting as a locking means to prevent overtravel of such gear.

It will be apparent that upon a quarter revolution of the spur gear 65ᶠ the gear 65ᵍ, carried upon the same shaft 65ᵉ, will rotate quarter of a revolution, effecting a movement of the adjacent indicator wheel 58 and disk between two of the teeth 58ᵉ, these teeth being so arranged as to correspond to one number on the indicator wheel, so that since these wheels are each provided with two complete sets of numbers, and the teeth 58ᶠ being proportionally located between the sets, it will be apparent that as the limit of one set is reached and the numeral 9 passes, the corresponding tooth 58ᶠ will actuate the gear 65ᶠ, rotating it a quarter revolution, and thereby, as explained above, rotate the adjacent indicator wheel a distance equal to two of the teeth 58ᵉ, or one numeral. In other words, the wheel 58 will be operated by its neighbor on the right one number forward for each half revolution of such neighbor. In like manner a reverse movement will impart a reverse rotation to the driven wheel. By this arrangement the teeth of gear pinion 65ᵍ being normally out of engagement with the teeth of the indicator wheel, each of the wheels may rotate freely when actuated by its individually acting mechanism. The arms 65ᵇ are attached to or formed integrally with the bar 65, and the pins 65ᶜ are rigidly attached to said arms 65ᵇ. One of each pair of the uprights 64 carries a lug or shoulder 64ᵇ. Arms 67 are located on each side of the set of indicator wheels and are pivoted by the pin 69, or the like, to the shoulders 64ᵇ. These levers 67 are provided with the extremities 67ᵃ, slotted or apertured at 67ᵇ,—see Fig. 15—these slotted portions fitting over the ends of the shafts 62. A cross arm 67ᶜ connects the levers 67.

The operation of the above described mechanism is as follows: The movement of the rack strips 45, described above, through the medium of the toothed blocks 45ᶜ actuates successively the corresponding toothed gears 58ᵇ an amount proportional to the travel of the rack strips 45. Also, as will be apparent, each of these gears transmits a rotation to the corresponding of gears 58ᵇ carried on shafts 62, and the latter being in engagement with the toothed portion 58ᵉ of the the bars 57 will be moved forward, and, as will be more fully described below, in the tabulating of numbers the notched portion 57$^b$ being in engagement with its corresponding ratchet wheel 59, proper rotation of the latter will be effected. The parts and dimensions having been properly chosen, this rotation of the indicator 58 will be proportional to the movement of the associated mechanism, so that the prior depressing of a numeral key will result in the number corresponding thereto on the indicator wheel being rotated to the sight opening in the casing upon actuation of the actuating bar. Should an indicator wheel, for example, already indicate a number when the second number is added thereto, if the result exceeds nine the excess over 10 will be indicated by the second set of numbers of the indicator wheel and the indicator wheel adjacent on the left will be rotated a distance corresponding to one numeral thereof, thereby enabling the ready indication of the sums of numbers in units, tens, thousands, etc., columns.

It will be apparent that through the arrangement and operation of the parallel bars 57$^c$, when the cross arm 67$^c$ is raised, the lever 67 will operate to slide the blocks 63 and associated mechanism downwardly between the uprights 64 until said parallel bars 57$^c$ engage, by means of their toothed portion 57$^a$, the ratchet wheels 60. In this engagement movement of the bars 57 in the manner described above will result in a rotation being imparted to the indicator wheels 58, in succession from the lowest to the highest order, the reverse of that described above. This is to enable subtraction and totaling operations to be performed, as will be more fully described below. It is to be noted that upon a return movement of the bars 57 to normal position the toothed portions 57$^b$ or 57$^d$ will slide over the corresponding ratchet wheels 59 or 60 without rotating the indicator wheels, the spring detents 66 serving to produce this result.

The recording and tabulating of the numbers is accomplished in the following manner:

The bars 57 are provided with the teeth 57$^b$ adjacent the line thereof on the upper side. A plurality of character wheels 70 are provided, one for each order of numerals. These wheels 70—shown in Fig. 26, for example—are formed with a segment of increased diameter, indicated by numeral 70$^a$, on the outer surface of which is located the printing characters 70$^b$ corresponding to the numerals or characters carried by the keys 36. The character wheels 70 are centrally apertured, and are rotatably mounted upon the shaft 71, secured between uprights 72.

Formed on a portion of the periphery of the wheels 70 are the teeth 70$^c$,—see Figs. 2 and 26,—these teeth being a suitable pitch for engagement and meshing with teeth 57$^f$. A spur or lug 70$^d$ projects outwardly from one side of each of the wheels 70. A striker arm 57$^g$ is carried by and attached to the extremity of each of the bars 57. The arrangement of these parts is such that when in normal position the striker arms 57$^g$ are in contact with spurs or lugs 70$^d$, while the teeth 57$^f$ are slightly out of mesh with teeth 70$^c$. Upon operating movement of the bars 57 the striker arms 57$^g$ will partially rotate the wheels 70 until the teeth 57$^f$ engage and mesh with the teeth 70$^c$. The characters 70$^b$ on the periphery of segments 70$^a$ are arranged as shown in Fig. 26 with zero character at the top and running therefrom to 9 at the bottom. A space is left above the zero character, as clearly shown in the drawings. The arrangement of these parts, and especially of the teeth and characters is such that when the numeral key 36 is depressed and the actuating bar operated to perform the operation described above, the character wheel 70 will be rotated through an angle proportional to the size of the numeral to be indicated, as will be more fully described. It will be obvious that when in the position shown in Fig. 2, for example, which is normal or rest position, the character wheels are free to rotate in a counter clockwise position, owing to the non-meshing of the teeth 70$^c$ with the teeth 57$^f$. As is well known, it is not desirable or necessary to provide numeral keys bearing the said characters, but it is necessary to provide for zero indication and recording to the right of any integers which can be positively indicated and recorded.

Located adjacent and to coact with the character wheels is the paper guide 75, shown in perspective in Fig. 21. This guide comprises spaced apart strips 75$^a$, between whch the paper is intended to be fed. Frames 75$^b$, 75$^c$ are secured to the strips 75$^a$, the latter being curved to form an angularly disposed bottom portion 75$^d$, as illustrated in Fig. 21. This arrangement provides an entrance slot 75$^e$ and an exit slot 75$^f$ for the paper strip. The frame 75$^c$ is provided with the cross strips 75$^g$ and 75$^h$, as shown in the drawings, against which the paper strip may rest, the latter also acting to direct the paper strip upwardly after its entrance through the slot 75$^e$. The arrangement of these cross strips 75$^g$, 75$^h$ is such as to leave an open space 75$^i$, at which point the printing on the paper strip is accomplished, as will be further explained. Uprights 76 are attached to the back of the machine casing 35 by means of clips 77, or the like, and extend upwardly above the top of the machine. Pivotally attached to the upper extremities of these uprights are the arms 78, between which is rotatably mounted the paper feed roll 79. From this feed roll the paper strip 80 is fed downwardly, as clearly shown in Fig. 8. The pivotal movement of the arms 78 enables them to be thrown to what I term inoperative position, as shown in Fig. 8, to provide for compactness when the machine is not in operation. Preferably I swing the arms 78 in the direction indicated by the arrow to the position indicated in dotted lines in Fig. 8 when in operative position, the spurs 76ª providing stops to maintain the arms 78 either in operative or inoperative position.

A pair of coacting feed rolls 81, 82, is located adjacent the bottom of the guide member 75—see Figs. 2 and 8, for example—and the paper strip 80 is fed therebetween. Positive means is provided to rotate the roller 81, and the arrangement of this and the roller 82 is such that the latter will be rotated by rotation of the former to positively feed the sheet or strip 80 upwardly in the guide member 75.

Adjacent the top of this guide member is provided a second pair of rollers 83, 84, coacting to grip and positively advance the feed strip 80. The rollers 81 and 82 are provided with intermeshing gears 81′ and 82′, respectively, insuring positive coaction thereof. The roller 81 is also attached to the shaft 81ª, which is extended beyond at one side thereof and carries a sprocket 81ᵇ adjacent its extremity. Similarly the rollers 83 and 84 are provided with intermeshing gears, the former being designated by 83′ and being carried on a shaft 83ª, which also carries a sprocket 83ᵇ adjacent its extremity. A chain 85 extends between and around the sprockets 81ᵇ, 83ᵇ. The shaft 83ª is provided with squared portions 83ᶜ at its extremity, which are located in a suitable aperture in the side wall of the casing 35 and adapted to be engaged by a key, or the like, for positive rotation, to insure the initial feeding and arrangement of the paper strip 80. The ratchet wheel 86 is attached adjacent the end of shaft 83. It will be apparent that when the paper strip is fed by hand, or the like, between the rollers 81 and 82, the shaft 83 may be rotated by a key, or the like, insuring positive feed of the paper strip upwardly in the guide members 75 until engaged by the rollers 83 and 84.

For automatic feeding of the paper after the printing of each number thereon, I provide a lever arm 90 attached to one arm 55ª carried by the actuating bar 55. This arm 90 is provided with a flattened extremity 90ª provided with the teeth 90ᵇ. These teeth coact with the teeth and ratchet wheel 86, so that upon return to normal position of the actuating bar 55 the teeth will engage the ratchet wheel 86 and positively feed the paper strip 80 upwardly in the guide member 75 to position ready for printing the next number. A spring detent 87 is provided in engagement with the ratchet wheel 86 to prevent reverse rotation thereof.

Upright supporting plates 91 are provided in the casing, and the feed rollers 81, 82 are journaled therein, as are the rollers 83 and 84. Brackets 92 are attached one to each of the plates 91, and attached adjacent the extremity of each of these brackets and extending across therebetween is the rubber buffer strip 93. This is located, as is shown in Fig. 2, across the space 75ᶦ of the guide member 75 and adjacent to the top of the segments 70ª of character wheels 70 when the latter are in normal position. A printing bar 94—see Figs. 2, 3, and 8—extends across and in back of the rubber buffer strip 93 and normally out of contact therewith. Movement of this printing bar is permitted relative to the supporting plates 91 by means of the cut-away portions 91ª thereof, as shown in Fig. 2. This printing bar 94 is carried by the levers 95 pivoted intermediate their extremities at 95ª and pivotally attached at 95ᵇ to an operating lever 96, carried by the arms 55ª of the actuating bar 55. It will be apparent that when the bar 55 is depressed the lever 96 will actuate the printing bar 94 to press the buffer strip 93 against the paper strip 80 and the latter adjacent the corresponding characters on character wheels 70, lever 96 being so arranged with respect to actuating bar 55 and the interposed associated mechanism that the numerals to be printed are in position and at rest when the actual printing is performed, that is, they arrive at such position just prior to the contact therewith of the printing bar.

A pair of ribbon-carrying rolls 99, 100 is provided, these rolls being horizontally arranged to carry the vertical shafts 99ª, 100ª, respectively, these being journaled in the bearings 101—see Fig. 8, for example. Above the latter are attached to the shafts 99ª, 100ª the ratchet wheels 99ᵇ, 100ᵇ. A printing ribbon 101ᵇ extends from around one of the rolls 99 and rollers 102, 103 vertically arranged adjacent the side of the set of character wheels 70. Between these rollers 102, 103 the ribbon 101 extends behind and closely adjacent the rubber buffer strip 93 on the opposite side of the paper strip 80, although it may be arranged on the same side of the latter if so desired. Upright shafts 104, 105 (see Fig. 8) are rotatably mounted upon brackets 106, said brackets being located adjacent each of the rollers 99, 100. Carried by these shafts 104, 105, adjacent their lower extremities, are the curved arms 104ª, 105ª, and also carried by the shafts 104, 105, adjacent their upper extremities, are attached the arms 104ᵇ, 105ᵇ. The latter normally rest at their extremities adjacent the ribbon-carrying rolls 99, 100.

A lever 108 is pivotally attached at one extremity at 108ᵃ to the bracket 108ᵇ carried by the cross arm 55ᶜ of the actuating bar 55, this pivotal connection 108ᵃ being such as to permit some lateral movement of the lever 108. The latter is bifurcated, and is provided with parallel arms 108ᶜ and 108ᵈ, these arms being toothed at 108ᶜ′ and 108ᵈ′ for engagement with the corresponding of the ratchet wheels 99ᵇ, 100ᵇ.

Adjacent the juncture of the arms 108ᶜ, 108ᵈ, and carried by the bottom of the casing 35, is the foot bearing 110, in which is oscillatably mounted a pivot plate or knife edge 111, which seats at its upper end in a socket 108ᵉ in the lower surface of the lever 108, as clearly shown in Figs. 6 and 8. This construction permits lateral movement or oscillation of the lever 108, so as to permit engagement of either of the arms 108ᶜ, 108ᵈ with corresponding ratchet wheel 99ᵇ, 100ᵇ, as will be clearly understood. The extremities of arms 104ᵃ, 105ᵃ normally contact with the extremities of the arms 108ᶜ, 108ᵈ, respectively. A lug 101ᵃ is carried by the ribbon 101 adjacent its end, this lug normally fitting in the socket 100ᵈ in the feed roll 100 when the ribbon 101 is wound therearound. The extremity of arm 105ᵇ is closely adjacent the ribbon, and the operation of the mechanism is as follows:

Each time the actuating bar 55 is depressed when the mechanism is in the position shown, the roller 99 may be partially rotated through the medium of the toothed arm 108ᶜ, causing a movement of the ribbon 101ᵇ between the rollers 102, 103. As the ribbon approaches its extremity on the roll 100 the stop 101ᵃ strikes the extremity of the arm 105ᵇ, and the shaft 105 is rotated, causing the extremity of the arm 105ᵃ to force the arm 108ᵈ to contact with the ratchet wheel 100ᵇ, whereupon further actuations of the bar 108 will operate to wind the ribbon upon the roll. Each actuation of the actuating bar 55 causes the hammer or printing bar 94 to strike the rubber buffer strip 93, causing printing of the characters immediately adjacent thereto upon the strip of paper 80, the same being moved upwardly in the guide member 75 after each operation of the machine.

It is desirable in the use of these machines to have zero printed where no key is depressed when one of an order of numerals has been depressed when the latter lies to the right of the order in which the key has been depressed. In other words, where no integer is to be set down to the right of an integer which must be set down, it is desirable to have zeros printed. For example, where $1200.00 is to be recorded and added, the numeral 1 key being depressed in the sixth longitudinal row of numerals from the right-hand side of the machine and the numeral 2 in the fifth order of numerals, it is desirable to have four zeros located at the right-hand of these numerals without the positive depressing of keys, and I provide for these results in the following manner:

Actuating blocks 115 are rotatably mounted upon a shaft 116, the same being suitably mounted in stationary parts of the framework. Each of these blocks is provided with a tooth 115ᵃ normally contacting with the top of teeth 70ᵉ of an adjacent character wheel 70. A coil spring 117 is located between the front of each of blocks 115 and the braces 44ᵃ, as shown in Fig. 2, for example. These blocks are further provided with the cut-away portions 115ᵇ above the teeth 115ᵃ. Located upon the top of each of the blocks 115 and extending over its right-hand member, as viewed from the front of the machine, is a stud or shoulder 115ᶜ, contacting with the top of its neighbor, as shown in Fig. 7, when in normal position. It will be apparent that by this arrangement one of the blocks 115ᶜ may be depressed, or permitted to rotate downwardly about the shaft 116 without interfering with its left hand neighbors, but it will operate to depress its right hand neighbor in the absence of conflicting operations. When one of the character wheels is actuated to aline one of its numerals with the printer bar 94, the top of teeth 70ᵉ being removed from contact with spur 115ᵃ, the block 115 is rotated downwardly by means of the action of the corresponding spring 117; and, as stated above, in the absence of conflicting operations the blocks on the right-hand side of the depressed block 115 will also be depressed through the medium of the force of the spring 117, thereby operating to partially rotate their corresponding character wheels 70. The arrangement of these parts is such that this partial rotation is just sufficient to aline the first or zero character with the printing mechanism, so that it would be apparent zero will be printed on the right-hand of any depressed numeral where no corresponding numeral keys are depressed. In other words, as in the example given above, where $1200.00 is to be printed, the numbers 1 and 2 in the proper rows are depressed, and zeros will be automatically printed in the remaining rows to the right-hand thereof. As explained above, preliminary rotation of the blocks 70, where corresponding keys are depressed, as caused by the striker bars 57ᵍ, is such as to aline the numeral 1, or second character of the corresponding character wheel with the printing mechanism. This is desirable, since no key will be struck in any row unless an integer is to be printed for that order of numerals, and this arrangement permits the zero printing or recording without interference with the integer printing mechanism, as will be apparent.

To provide for re-setting keys, or returning same to normal position after the recording and indicating operations, I provide a rotatable cross shaft 120—see Figs. 8 and 9, for example—this shaft being journaled in suitable bearings 121. Attached to the shaft 120 is the ratchet wheel 122. A lever 123 is attached at its forward end to one of the arms $55^a$, of actuating bar 55, and at its other extremity this lever carries an actuating arm 124 having the tooth or spur $124^a$. The latter is arranged to engage the teeth of the ratchet wheel 22 when moved downwardly relatively to the shaft 120, as clearly shown in Fig. 8. Carried by and attached to the shaft 120 are the actuating levers 125, normally resting upon pins $40^a$ projecting outwardly from the re-set keys 40 adjacent their lower extremities.

The ratchet wheel 122 is provided with an apertured hub $120^a$, and is preferably attached to the shaft 120 by a feather or spline $120^b$, which will permit longitudinal movement of the ratchet wheel relative to the shaft without affecting its engagement therewith. It will be apparent that when the actuating bar 55 is depressed the lever 124 will be moved upwardly and also the actuating arm 124 will move backwardly past the ratchet wheel. The arm 124, being of spring material, such as steel or the like, the teeth $124^a$ will slip by the ratchet wheel. When the actuating bar is returned to normal position, the lever 123 will move downwardly and the teeth $124^a$ will rotate the shaft through the medium of the ratchet wheel, and this rotation will operate the levers 125 to depress the re-set or correction keys 40, as will be apparent, and this depression will result in a sliding of the locking plates 38 so as to release the depressed keys 36. The shoulder $40^c$ of these keys 40 is of such height as to prevent locking of the re-set keys when depressed relative to the locking plates 30. It will be obvious that individual re-set or correction keys may be operated by hand to re-set any keys which may have been wrongly pressed, as explained above, this individual re-setting not affecting the keys in the other rows.

A shaft 128 is rotatably mounted in the casing and carries a forked arm or lever 129 adjacent its extremity. This fork embraces the ratchet wheel 122, as is clearly shown in Figs. 8 and 9, for example. In its forward end the shaft 128 projects slightly beyond the casing 35, and an operating lever or handle $128^a$ is attached thereto. When this handle is swung in the proper direction the fork 129 will move the ratchet wheel 122 longitudinally of the shaft 120 and out of the path of the engaging arm 124. In the operation of this repeat mechanism, assuming that a numeral is to be tabulated several times, the proper keys are first depressed and the handle $128^a$ thrown into repeat position. The actuating bar 55 is then depressed one less than the number of times the number is to be repeated. Before depressing the actuating bar for the last tabulation of the repeated number, the handle $128^a$ is moved to normal position and the last operation of the actuating bar 55 will operate the re-setting mechanism, as described above, thereby returning the keys to normal position after the last tabulation thereof.

It will be apparent that in the tabulation of a plurality of numbers the mechanism described above will operate the indicator wheels 58 in such wise that the total or sum of the numbers tabulated would be correctly indicated by the wheels in the manner explained above. Inasmuch, however, as the recording wheels 70 return after each tabulating operation to normal or rest position, it will be obvious that it is necessary to provide means for printing the total or sum of the tabulated members. I utilize the indicator wheels, together with coacting mechanism, to produce this result.

A pair of lever arms 135 extend from adjacent the front of the machine rearwardly thereof and are pivoted at $135^a$ to the casing, or other fixed support, intermediate their extremities. At one extremity each of these levers 135 is slotted, as indicated by numeral $135^b$, and at their other extremities these levers are pivotally attached at $135^c$ to the sides $136^a$ of the rectangular frame, generally indicated by numeral 136, comprising the sides $136^a$ and the top and bottom $136^b$, $136^c$, respectively.

Located below the levers 135 are the levers 137, pivoted at $137^a$ intermediate their extremities, and each having an extremity pivoted at $137^b$ to the sides of the frame 136. A cross arm or strip $137^c$ extends across and is attached to the other extremities of the levers 137, projecting upwardly above such levers a slight amount, as clearly shown in Fig. 15.

Coil springs 138, located below the bottom $136^c$ of the frame 136, extend to the bottom of the casing 35—see Fig. 2. A key $136^d$ extends upwardly from and is attached to the top $136^b$ on the frame, this being what I term the totaling key, and having the stem $136^e$ projecting through a suitable aperture in the top of the machine casing. It will be apparent, as shown in Fig. 1, that when the total key $136^d$ is depressed the top portion of cross arm or strip $137^c$ will rest adjacent the bottom of the indicator wheels 58 in position to engage the stops or lugs 58ᵈ thereon, for a purpose to be further described. The forked or slotted extremities of the levers 135 are raised, as is obvious.

Slidably mounted in the slots 135ᵇ are the pins 139, carried by reciprocable blocks 140, slidably mounted between and in the guide 141 extending upwardly from the casing of the machine. A cross head 140ᵃ is carried at the top of each of the blocks 140, this cross head being slotted, as indicated at 140ᵇ. Slidably mounted in these slots 140ᵇ, and extending therebetween, is a reciprocable bar 142—see Fig. 6—carrying the collars 142ᵃ outwardly of the cross heads 140ᵃ—see Figs. 6 and 8. The bar 142 is continued around the collars and is pivotally engaged at its extremities by the extremities of the levers 143, which have their other extremities pivotally attached to links 144, which in turn, are pivotally attached at their other extremities to brackets 145 carried by the casing of the machine.

Links 146 are each pivotally attached at one extremity to the links 144, intermediate the extremities of the latter, these links being pivoted at their other extremities to brackets 147 carried by the cross strip 55ᵍ of the actuating bar 55—see Fig. 10.

Carried by each of the bars 57 are the blocks 57ᵍ, 57ʰ, the same being spaced apart and securely attached to the bars. Rods 57ⁱ extend between and are carried by these blocks 57ᵍ and 57ʰ. A collar 57ᵏ is slidably mounted on each of the rods 57ⁱ, being provided with the depending portion 57ᵐ, constituting a deflector, the same being slightly bent. A spring 57ⁿ is coiled around each of the rods 57ⁱ and extends between the back of the collar 57ᵏ and block 57ʰ, as clearly shown in Fig. 2.

Extending upwardly from the cross shaft 142 are engaging pins 142ᵇ located, when in normal position, beneath and slightly forward of the collars 57ᵏ, as shown in Figs. 2 and 6, for example. These pins are spaced apart by means of the thimbles on each collar 142ᶜ.

A lever 160 is pivotally mounted intermediate its extremities to the casing of the machine at 160ᵃ, as shown in Fig. 15, for example. Adjacent one extremity of this lever is the slot 160ᵇ fitting around and engaging the pin 67ᵈ carried by the cross arm 67ᶜ. Adjacent its other extremity it is pivotally attached to a bar 161 which extends through a suitable aperture in the cross bar 136ᵇ of the totaling mechanism. This bar carries the disk 161ᵃ at its upper extremity, constituting therewith a subtraction key, the operation of which for subtraction is described below. A pin 136ʰ, carried by one of the arms 136ᵃ and located out of contact with the lever 160, engages an extremity of the latter after a partial downward movement of the totaling key and operates it to depress the rear end of arms 67. It will be apparent that when the totaling key 136ᵈ is depressed the ends of the lever 67 will carry downwardly the blocks 63, thereby depressing the indicator wheel carrying cross shaft 62, so that the ratchet wheels 59 are moved out of engagement with the toothed portions 57ᵇ of bars 57, at the same time that the ratchet wheels 60 are moved into engagement with the toothed portion 57ᵈ of parallel bar arms 57ᶜ.

The depression of totaling key 136ᵈ operates also to raise the blocks 140 and cross heads 140ᵃ at the same time as the shaft 142, until the pins 142ᵇ engage the collars 57ᵏ, being guided to engaging position by means of the deflecting portion 57ᵐ. At the same time the end of the cross strip 137ᶜ is raised to position adjacent the bottom of the indicator wheels 58, as explained above. The actuating bar 55 is then depressed. This will operate, as in the case of tabulation of original members, in sliding the pin-carrying casings 42 successively through the medium of levers 50. Inasmuch as no keys are depressed, however, no engagement will be present between the pins 43 and the rack strips 45, so that the pin-carrying casing merely performs an idle movement. The links 146 operate to move the upper extremities of links 144 to the right, as viewed in Fig. 2, thereby moving through the medium of collars 57ᵏ and pins 142ᵇ, the bars 57, except as will be described below. This movement of the bars will actuate the character wheels 70, as in the case of the individual tabulations.

To insure the alinement of the proper numeral on the character wheel 70 with the printing bar 94, my mechanism is arranged and operates as follows: The teeth 57ᵈ of bars 57 in this sliding movement will engage the corresponding ratchet wheels 60 as described above, and will operate to re-rotate the respective wheels 58 to zero positions, this rotation being permitted until the stops 58ᵈ strike the top of the cross arm 137ᶜ, as in the position shown in Fig. 2, for example, the lever 137 not being shown in raised position in that view. Inasmuch as two complete sets of numerals are provided on each of the indicator wheels, as described above, two of these stops are provided, and when either of the same contacts with the cross arm 137ᶜ the corresponding indicator wheel will be in zero position. The ratchet teeth and coacting members are so arranged that a re-rotation of indicator wheels from a position showing a numeral thereon will, through the medium of bars 57, cause a coaction of the character wheels 70 of an amount sufficient to aline the proper numeral on the corresponding character wheel with the printing bar 94; or, in other words, for example, assuming that numeral 4 is in view on one of the indicator wheels 58 when the same is reversely rotated until the stop 58$^d$ contacts with the cross arm 137$^c$, the numeral 4 on the corresponding character wheels will be in alinement with the printing bar 94. When the stop of the indicator wheel 58 has contacted with the cross arm 137$^c$, the further movement of the shaft 142, caused by the full depressing stroke of the actuating bar, will be permitted notwithstanding, since collars 57$^k$ will slide on rods 57$^l$ against the action of springs 57$^n$, thus permitting completion of the actuating bar stroke without further movement of the bars 57, and consequently without further movement of the character wheels 70. It will be apparent that the advantage of this totaling mechanism is not only in its simplicity and specific arrangement, but also in the fact that the totaling operation automatically returns the indicator wheels to zero position.

The operation of the machine in performing a subtraction is as follows:

The proper keys are depressed, as in the case of the tabulation of any sum. The subtraction key 161 is then depressed, bringing the ratchet wheels 60 into mesh with the teeth 57$^d$ of the bar arms 57$^c$, and the main or actuating bar 55 is then depressed. This results in the numeral being tabulated in the usual manner through the medium of the mechanism described above, the only difference in the operation of the machine being that a reverse rotation is imparted to the indicator wheels 58, this rotation being proportional to the numeral of the key depressed in each row of numerals. In other words, the arrangement of the notched bars and ratchet wheels is such that when a numeral key is depressed in a row, the corresponding indicator wheel will be reversely rotated an amount sufficient to aline the numeral indicating the difference between ten and the numeral of the depressed key, or the difference of that numeral and the one previously indicated on the wheel, into alinement with the sight opening. It will thus be apparent that the number which is to be tabulated is printed in the column with the numbers to be added, but it is subtracted from the indication of the indicator wheels, and it will be apparent that when the total is printed, the proper result having been shown on the indicator wheels, their coaction with the totaling mechanism will insure the proper addition of the negative with the positive numbers.

A pin 161$^b$ is carried by the bar 161, and a spring 163 extends therefrom to the pin 164 carried by the cross arm 136$^b$, this pin operating to return the subtraction mechanism to normal or rest position when the key or bar 161 is released.

I provide a long lever 170,—see Fig. 31— this lever being pivoted at 170$^a$ to a bracket 171, indicated in dotted lines in Fig. 2, the same being attached to the casing of the machine. The lever 170 at one extremity lies adjacent, at 170$^b$, a pin 161$^c$ carried by the subtraction bar 161, so that the depression of such key will operate to raise the rear end of the lever 170, which is provided with an upwardly projecting portion 170$^c$ carrying two characters 170$^d$, 170$^e$. This arm or portion 170$^c$ rests adjacent the right-hand character wheel, 70, as viewed from the front of the machine, and is so arranged that the depression of the subtraction key alone will aline the character 170$^d$, which is a minus sign, with the printing bar, and this minus sign or character will be printed at the right-hand of the corresponding numeral. The pin 161$^c$ normally lies above and out of contact with the lever portions 170$^f$, which is bent for contact therewith—see Fig. 4. Also, when the totaling key is depressed the cross bar 136$^b$, which normally contacts with extremity 170$^b$ of levers 170, operates to aline the character 170$^e$, which is a star or similar character, with the printing bar, whereupon the same will be printed to the right of the total, indicating that the same is a total. It will be apparent, as shown in Fig. 4, that for totaling the lever 170 is moved its full movement, while it is only partially moved when the subtraction key is depressed.

It is obvious that the specific operations of the various parts of my device have been described with sufficient clearness to enable one skilled in the art to understand the same. However, for the sake of clearness I will briefly summarize the operation of my machine.

When a number is to be handled proper keys 36 are depressed, and, assuming that it is a simple tabulation, the actuating bar 55 is depressed, and, as fully described above, assuming that the indicator wheels are at zero position, they will be rotated successively to indicate the numeral of the numeral being tabulated, and also the character wheels 70 will be actuated to aline with the printing bar 94, whereupon the latter will print upon the strip of paper 80 the number. Assuming, for example, that a second number is to be tabulated and to be subtracted from the first number, the proper keys are again depressed, the re-setting mechanism having returned the former depressed keys to normal position upon the return of the actuating bar 55, and the subtraction key 161 is then depressed and held in depressed position when the actuating bar is depressed, resulting in printing of the second number below that first tabulated, and also resulting in the automatic subtraction of the same on the indicator wheels, leaving the latter in proper position to indicate the amount of this subtraction, as is fully described above. Assuming that other numbers are to be tabulated and added, the machine is properly actuated to record and tabulate the same, the indicator wheels after each operation indicating the total of all the numbers tabulated. When the operator is ready for the totaling operation, the totaling key 136$^d$ is depressed, carrying with it the subtraction mechanism through the medium of the pin 136$^h$, and the actuating bar 55 is then depressed, whereupon the indicator wheels are reversely rotated to zero-indicating position and, by means of the mechanism and operations described above, the proper numbers on the recorder wheels 70 are alined with the printing bar 94, and the total is printed. Springs 200 are attached to and extend between the casing and actuating bar cross arm 55$^g$—see Fig. 3—and serve to return the actuating bar and mechanism to normal position.

It will be obvious that my device is susceptible of many changes and modifications, and I do not wish to be restricted to the form shown or described beyond the scope of the appended claims.

I claim:

1. In a device of the class described, numeral keys, a movable member located below said keys, said member being provided with shoulders spaced apart, the distance between each pair of shoulders corresponding to the numeral carried by the corresponding key, pin members located intermediate said keys and said movable member, each of said pins being arranged to be actuated by operation with a corresponding key to move between a corresponding pair of shoulders on said movable member, means to initially move said pin after depression thereof into contact with one of said adjacent shoulders, and secondly to move said pin and shoulder carrying member, and indicating mechanism actuatable on said movement of said shoulder carrying member to record the numeral corresponding to that of said actuated key.

2. In a device of the class described, numeral keys, a movable member located below said keys, said member being provided with shoulders spaced apart, the distance between each pair of shoulders corresponding to the numeral carried by the corresponding key, pin members located intermediate said keys and said movable member, each of said pins being arranged to be actuated by operation of a corresponding key to move between a corresponding pair of shoulders on said movable member, means to initially move said pin, after depression thereof, into contact with one of said adjacent shoulders and secondly to move said pin and shoulder carrying member, and recording mechanism actuatable on said movement of said shoulder carrying member to record the numeral corresponding to that of said actuated key.

3. In a device of the class described, depressible numeral key members, a movable member located below said key members, said member being provided with shoulders spaced apart, the distance between each pair of shoulders corresponding to the numeral carried by the corresponding key, pin members located intermediate said keys and said movable member, each of said pins being arranged to be depressed by depression of a corresponding numeral key to move between the corresponding pair of shoulders on said movable member, means to initially move said pin after depression thereof into contact with one of said adjacent shoulders, and secondly to move said pin and shoulder carrying member, indicating mechanism actuatable on said movement of said shoulder carrying member to indicate the numeral corresponding to that of said actuated key member or the sum of such number and that previously indicated on said indicating mechanism, and means to retain said depressed numeral key in depressed position during the operative movement of said pin.

4. In a device of the class described, numeral keys, a movable member located below said keys, said member being provided with shoulders spaced apart, the distance between each pair of shoulders corresponding to the numeral carried by the corresponding numeral key, pin members located intermediate said keys and said movable member, each of said pins being arranged to be actuated by operation of a corresponding key to move between a corresponding pair of shoulders on said movable member, means to initially move said pin when depressed into contact with one of said adjacent shoulders and secondly to move said pin and shoulder carrying member, indicating mechanism actuatable upon said movement of said shoulder carrying member to indicate the numeral corresponding to the numeral of said actuated key, and recording mechanism actuatable on said movement of said shoulder carrying member to record the numeral corresponding to that of said actuated key.

5. In a device of the class described, a row of numeral keys, a casing slidably mounted beneath said keys, a shoulder carrying member located beneath said casing, adjacent pairs of shoulders on said member being spaced apart distances varying to correspond with the different numerals on said keys, pins mounted in said casing, each of said pins being arranged to be depressed by a corresponding key to move between a corresponding pair of shoulders on said shoulder carrying member, means to move said casing until any of said pins in depressed position contacts with a shoulder of said shoulder carrying member, said means being arranged to then move said member, and indicating means actuatable upon said movement of said shoulder carrying member to indicate the numeral of said actuated key.

6. In a device of the class described, a row of numeral keys, said keys being depressible and each provided with a plunger portion, a plurality of pins, one located beneath each of said plungers and arranged to be depressed by operation of said keys, a member carrying said pins, a second member movably mounted beneath said pin carrying member and provided with spaced apart shoulders, each pair of shoulders being spaced apart a distance corresponding to one of the numerals on a corresponding key, means to move said pin carrying member, whereby when one of said keys is depressed the corresponding pin will move between the corresponding pair of shoulders and the movement of said pin carrying member will first move said depressed pin into contact with one of said shoulders and then move said shoulder carrying member, and means operable upon said last named movement to indicate the numeral of said depressed key.

7. In a device of the class described, a row of numeral keys, said keys being depressible and each provided with a plunger portion, a plurality of pins, one located beneath each of said plungers and arranged to be depressed by operation of said keys, a member carrying said pins, a second member movably mounted beneath said pin carrying member and provided with spaced apart shoulders, each pair of shoulders being spaced apart a distance corresponding to one of the numerals on a corresponding key, means to move said pin carrying member, whereby when one of said keys is depressed the corresponding pin will move between the corresponding pair of shoulders and the movement of said pin carrying member will first move said depressed pin into contact with one of said shoulders and then move said shoulder carrying member, means operable upon said last named movement to indicate the numeral of said depressed key, and means to record such numeral.

8. In a device of the class described, a row of numeral keys, said keys being depressible and each provided with a plunger portion, a plurality of pins, one located beneath each of said plungers and arranged to be depressed by operation of said keys, a member carrying said pins, a second member movably mounted beneath said pin carrying member and provided with spaced apart shoulders, each pair of shoulders being spaced apart a distance corresponding to one of the numerals on a corresponding key, means to move said pin carrying member, whereby when one of said keys is depressed the corresponding pin will move between the corresponding pair of shoulders and the movement of said pin carrying member will first move said depressed pin into contact with one of said shoulders and then move said shoulder carrying member, means operable upon said last named movement to indicate the numeral of said depressed key, and means to resist the movement of said shoulder carrying member.

9. In a device of the class described, a row of numeral keys, said keys being depressible and each provided with a plunger portion, a plurality of pins, one located beneath each of said plungers and arranged to be depressed by operation of said keys, a member carrying said pins, a second member movably mounted beneath said pin carrying member and provided with spaced apart shoulders, each pair of shoulders being spaced apart a distance corresponding to one of the numerals on a corresponding key, means to move said pin carrying member, whereby when one of said keys is depressed the corresponding pin will move between the corresponding pair of shoulders and the movement of said pin carrying member will first move said depressed pin into contact with one of said shoulders and then move said shoulder carrying member, means operable upon said last named movement to indicate the numeral of said depressed key, and means to resist the movement of said shoulder carrying member, said means comprising notches on said member and a spring detent fitting therebetween.

10. In a device of the class described, numeral keys, actuating mechanism, a slidable rack strip, means interposed between said keys and said rack strip whereby depression of one of said keys and actuation of said mechanism operate to slide said strip a distance corresponding to the numeral on said key, a character bearing recorder wheel, means to transmit the movement of said rack strip to said character wheel, said means comprising a rack carried by said strip, a reciprocable strip adapted to operate said character wheel, means to transmit the movement of said rack to said last named strip, said means comprising a rotatable cross shaft, a gear carried thereby and meshing with said rack, said second named strip being provided with a toothed portion, and a pinion carried by said shaft and meshing with said toothed portion.

11. In a device of the class described, numeral keys, printing mechanism, a character bearing wheel, actuating mechanism adapted after depression of one of said keys to aline the numeral on said wheel corresponding to that on said depressed key with said printing mechanism, said actuating mechanism comprising reciprocable strips, said strips being provided with teeth, said character wheels being provided with teeth adapted to mesh with said teeth of said actuating strip, whereby the operation of said actuating mechanism after depressing a key will cause said reciprocation of said strip and partial rotation of said wheel, said wheel and strip being out of toothed engagement when in normal or rest position, means to cause meshing of said character wheel with said strip upon operation of said actuating mechanism, said means comprising a lug eccentrically mounted on said wheel, and an arm carried by said strip and arranged to contact with said lug to partially rotate said wheel until the teeth thereof mesh with those of said strip.

12. In a device of the class described, numeral keys, printing mechanism, a character bearing wheel, actuating mechanism adapted after depression of one of said keys to aline the numeral on said wheel corresponding to that on said depressed key with said printing mechanism, said actuating mechanism comprising reciprocable strips, said strips being provided with teeth, said character wheels being provided with teeth adapted to mesh with said teeth of said strip, whereby the operation of said actuating mechanism after depressing a key will cause said reciprocation of said strip and partial rotation of said wheel, said wheel and strip being out of toothed engagement when in normal or rest position, means to cause meshing of said character wheel with said strip upon operation of said actuating mechanism, said means comprising a lug eccentrically mounted on said wheel, and an arm carried by said strip and arranged to contact with said lug to partially rotate said wheel until the teeth thereof mesh with those of said strip, numerals on said character wheel arranged so that such movement into meshing engagement with said strip will result in the first integer of said numerals being alined with said printing mechanism.

13. In a device of the class described, a row of numeral keys, an indicating member and a recording member, actuating mechanism, a rack strip, means interposed between said strip and keys in such wise that depression of one of the latter and succeeding actuation of said actuating mechanism will move said rack strip an amount corresponding to the movement of said depressed key, means to transmit said movement simultaneously to said indicator and to said recorder whereby said numeral will be indicated and recorded, said means comprising a reciprocable strip, said indicator being provided with a ratchet wheel, said recorder being provided with teeth, said second strip being provided with a ratchet portion adapted to engage said ratchet wheel, and a toothed portion adapted to mesh with the teeth of said recorder.

14. In a device of the class described, a numeral key, actuating mechanism, a slidable rack strip, means interposed between said keys and said rack strip whereby depression of one of said keys and actuation of said mechanism will operate to slide said strip a distance corresponding to the numeral on said key, an indicator wheel, means to transmit the movement of said rack strip to said indicator wheel, said means comprising a ratchet wheel attached to said indicator wheel, a reciprocable strip having teeth adapted to engage said ratchet wheel, and means to transmit the movement of said rack strip to said toothed strip, said last named means comprising a cross shaft and gears carried thereon, said rack strips being provided with a toothed member, said second strip being provided with a toothed portion.

15. In a device of the class described, a plurality of rows of numeral keys, character wheels, one of each of said wheels corresponding to a row of numeral keys, said wheels being rotatably mounted and provided with numeral characters corresponding to those of said keys, printing mechanism, actuating mechanism adapted to rotate said character wheels when a key in the corresponding row of numeral keys has been depressed whereby the numerals carried by said depressed keys will be printed, means coacting with said character wheels to cause actuation of the latter to print where no key in the corresponding row of numeral keys has been depressed and when such row lies to the right of a row in which a key has been depressed, said means comprising pivotally mounted members associated with said character wheels, and springs operating to actuate said last named members to cause said character wheels to present zeros to said printing mechanism.

16. In a device of the class described, a plurality of rows of numeral keys, printing mechanism, a plurality of character bearing wheels, an actuating mechanism adapted after depression of a key in any of said rows to aline the numeral corresponding to that on said key on the character bearing wheel corresponding to the row in which said key is depressed with said printing mechanism, said actuating mechanism comprising reciprocable strips, said strips being provided with teeth, said character wheels being provided with teeth adapted to mesh with the teeth of said strip whereby the operation of said actuating mechanism after depressing the key will cause said reciprocation of said stop and partial rotation of said wheel, said wheel and strip being out of toothed engagement when in normal or rest position, members pivotally mounted one adjacent each of said wheels, said members having a tooth or the like normally engaging one of the teeth of said character wheels, each of said members being provided with a portion engaging its neighbor on one side, and springs associated coacting with said members to partially rotate the same and thereby partially rotate the corresponding character wheels when its neighbor on one side is partially rotated.

17. In a device of the class described, a plurality of rows of numeral keys, printing mechanism, a plurality of character bearing wheels, an actuating mechanism adapted after depression of a key in any of said rows to aline th numeral corresponding to that on said key on the character bearing wheel corresponding to the row in which said key is depressed with said printing mechanism, said actuating mechanism comprising reciprocable strips, said strips being provided with teeth, said character wheels being provided with teeth adapted to mesh with the teeth of said strip whereby the operation of said actuating mechanism after depressing the key will cause said reciprocation of said strip and partial rotation of said wheel, said wheel and strip being out of toothed engagement when in normal or rest position, blocks pivotally mounted one adjacent each of said wheels, said blocks having a tooth or the like normally engaging one of the teeth of said character wheels, each of said blocks being provided with a portion engaging its neighbor on one side, and springs associated coacting with said blocks to partially rotate the same and thereby partially rotate the corresponding character wheels when its neighbor on one side is partially rotated.

18. In a device of the class described, a plurality of numeral keys, indicator wheels mutually adjacent and relatively rotatable, actuating mechanism operable to actuate said indicator wheels to indicate the amount of numerals on any of said keys which may be actuated, said indicator wheels being each provided with a tooth on one side thereof, a gear actuatable by said tooth, a shaft carried by said gear, and a pinion on said shaft, each of said wheels being provided with gear teeth at one side thereof, said pinion being adapted to engage said teeth of an adjacent wheel when said gear wheel is actuated, said pinion being normally out of engagement with said teeth of said adjacent wheel.

19. In a device of the class described, a plurality of rows of numeral keys, a set of pins located beneath each of said rows, one of said pins being arranged to coact with each of said keys, movable members carrying said pins, means to move said member, said means comprising an actuating member, a reciprocable member, said actuating member and said reciprocable member being operatively attached, and levers arranged to transmit movement of said reciprocable member to said pin carrying member, said levers being provided with a toothed extremity and teeth carried by said member adapted to mesh with said toothed extremities, said levers being pivotally attached to said pin carrying members.

20. In a device of the class described, a plurality of rows of numeral keys, a set of pins located beneath each of said rows, one of said pins being arranged to coact with each of said keys, movable members carrying said pins, means to move said member, said means comprising an actuating member, a reciprocable member, said actuating member and said reciprocable member being operatively attached, and levers arranged to transmit movement of said reciprocable member to said pin carrying member, said levers being provided with a toothed extremity and teeth carried by said member adapted to mesh with said toothed extremities, said levers being pivotally attached to said pin carrying members, said teeth and levers being arranged in such wise that said pin carrying members will be moved successively by said levers by movement of said reciprocable member.

21. In a device of the class described, indicator wheels, character wheels, printing mechanism associated with the latter, a totaling member, an actuating member, means arranged to operatively connect said indicator wheels with said character wheels, said means comprising toothed bars, ratchet wheels carried by said indicator wheels and arranged for engagement by said teeth of said bars, said bars being arranged to engage and move said character wheels, said totaling member being operable to move said connecting means into connecting position, and mechanism operable by said actuating member after such operation of such totaling member to move said indicator wheels to zero position, said operatively connecting member being arranged to transmit said movement to said character wheels whereby said printing mechanism may print the communication of said indicator wheels prior to their movement to said position.

22. In a device of the class described, indicator wheels, character wheels, a bar extending between each pair of character and indicator wheels, each of the latter being provided with a ratchet wheel, said bar having teeth arranged to engage said ratchet wheel, said character wheels being toothed, said bars having teeth adapted to mesh with said teeth of said character wheels, and mechanism arranged to operate said bars to move said indicator wheels to said position, said bars being adapted to simultaneously move said indicator wheels to said position, said bars being adapted to simultaneously move said character wheels to a position in which numerals thereon similar to those on said indicator wheels previous to their resetting will be recorded.

23. In a device of the class described, indicator wheels, character wheels, a bar extending between each pair of character and indicator wheels, each of the latter being provided with a ratchet wheel, said bar having teeth arranged to engage said ratchet wheel, said character wheels being toothed, said bars having teeth adapted to mesh with said teeth of said character wheels, said bar being normally out of engagement with said character wheels and indicator wheels, and mechanism arranged to operate said bars to move said indicator wheels to said position, said bars being adapted to simultaneously move said character wheels to a position in which numerals therein similar to those in said indicator wheels previous to their resetting will be recorded.

24. In a device of the class described, an indicator wheel, a character wheel, a bar extending therebetween, said character wheel being provided with ratchet teeth, said indicator wheel being provided with a ratchet wheel adapted to be engaged by said teeth, said character wheel being toothed, said bar being further provided with teeth adapted to mesh with said teeth of said character wheel, means to move said ratchet teeth and gear teeth of said bar into mesh with said ratchet wheel and character wheel respectively, and actuating mechanism adapted to rotate said indicator wheel, said bar being adapted to transmit such rotation to said character wheel.

25. In a device of the class described, indicator wheel having a stop thereon, a ratchet wheel carried thereby, a character wheel having teeth, a bar extending between said indicator wheel and said character wheel, said bar being provided with ratchet teeth adapted to engage said ratchet wheel, gear teeth adapted to engage said gear wheel, said bar and said indicator and character wheel being normally out of engagement, means to move said bar into engagement, said means comprising lever mechanism, a key adapted to actuate said lever mechanism, actuating mechanism adapted after actuation of said last named member to rotate said indicator wheels, and means to limit such rotation, said means co-acting with said stop, said rotation of said indicator wheel being operable through the medium of said bar to operate said character wheels.

26. In a device of the class described, an indicator wheel having a stop thereon, a ratchet wheel carried thereby, a character wheel having teeth, a bar extending between said indicator wheel and said character wheel, said bar being provided with ratchet teeth adapted to engage said wheel, gear teeth adapted to engage said character wheel, said bar and said indicator and character wheel being normally out of engagement, means to move said bar into engagement, said means comprising lever mechanism, actuating mechanism adapted after actuation of said last named member to rotate said indicator wheels, and means to limit such rotation, said means coacting with said stop and comprising a pivoted lever, said rotation of said indicator wheel being operable through the medium of said bar to operate said character wheel.

27. In a device of the class described, an indicator wheel having a stop thereon, a ratchet wheel carried thereby, a character wheel having teeth, a bar extending between said indicator wheel and said character wheel, said bar being provided with ratchet teeth adapted to engage said wheel, gear teeth adapted to engage said gear wheel, said bar and said indicator and character wheel being normally out of engagement, means to move said bar into engagement, said means comprising lever mechanism, a key adapted to actuate said lever mechanism, actuating mechanism adapted after actuation of said last named member to rotate said indicator wheels, and means to limit such rotation, said means comprising an actuating lever and means movable thereby into operative engagement with said bar, said means coacting with said stop, said rotation of said indicator wheel being operable through the medium of said bar to operate said character wheels.

28. In a device of the class described, an indicator wheel having a stop thereon, a ratchet wheel carried thereby, a character wheel having teeth, a bar extending between said indicator wheel and said character wheel, said bar being provided with ratchet teeth adapted to engage said wheel, gear teeth adapted to engage said character wheel, said bar and said indicator and character wheel being normally out of engagement, means to move said bar into engagement, said means comprising lever mechanism, a key adapted to actuate said lever mechanism, actuating mechanism adapted after actuation of said last named member to rotate said indicator wheels, and means to limit such rotation, said means comprising an actuating lever and means movable thereby into operative engagement with said bar, said means coacting with said stop, said rotation of said indicator wheel being operable through the medium of said bar to operate said character wheels, said bar being provided with slidable collars, and means comprising reciprocable pins adapted to engage said collars.

29. In a device of the class described, an indicator wheel having a stop thereon, a ratchet wheel carried thereby, a character wheel having teeth, a bar extending between said indicator wheel and said character wheel, said bar being provided with ratchet teeth adapted to engage said wheel, gear teeth adapted to engage said character wheel, said bar and said indicator and character wheel being normally out of engagement, means to move said bar into engagement, said means comprising lever mechanism, a key adapted to actuate said lever mechanism, actuating mechanism adapted after actuation of said last named member to rotate said indicator wheels, means to limit such rotation, said means comprising an actuating lever and means movable thereby into operative engagement with said bar, said means coacting with said stop, said rotation of said indicator wheel being operable through the medium of said bar to operate said character wheel, said bar being provided with slidable collars, and means comprising reciprocable pins adapted to engage said collars, and springs carried by said bar and arranged to normally resist the movement of said collar thereon.

In testimony whereof, I have subscribed my name.

CHARLES E. NICHOLSON.

Witnesses:
 HENRY A. PARKS,
 EDYTHE M. ANDERSON.

---

It is hereby certified that in Letters Patent No. 1,241,140, granted September 25, 1917, upon the application of Charles E. Nicholson, of Berwyn, Illinois, for an improvement in "Tabulating-Machines," an error appears in the printed specification requiring correction as follows: Page 14, claim 22, line 128, beginning with the word "said" second occurrence, strike out all to and including the word "position", line 130; and that the said Letters Patent should be read with this correction therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 235—60.